(12) United States Patent
Burger

(10) Patent No.: US 7,559,050 B2
(45) Date of Patent: Jul. 7, 2009

(54) GENERATING SOFTWARE DEVELOPMENT TOOLS VIA TARGET ARCHITECTURE SPECIFICATION

(75) Inventor: Julian Burger, Bothell, WA (US)

(73) Assignee: Microsoft Corporation, Redmond, WA (US)

( * ) Notice: Subject to any disclaimer, the term of this patent is extended or adjusted under 35 U.S.C. 154(b) by 651 days.

(21) Appl. No.: 10/610,692

(22) Filed: Jun. 30, 2003

(65) Prior Publication Data

US 2004/0268327 A1 Dec. 30, 2004

(51) Int. Cl.
G06F 9/44 (2006.01)
(52) U.S. Cl. .................. 717/106; 717/100; 717/107; 717/120
(58) Field of Classification Search .................. 717/106, 717/107, 140, 147, 100, 120
See application file for complete search history.

(56) References Cited

U.S. PATENT DOCUMENTS

| | | | |
|---|---|---|---|
| 4,197,978 A | | 4/1980 | Kasper |
| 4,734,854 A | * | 3/1988 | Afshar ................... 717/107 |
| 5,339,419 A | | 8/1994 | Chan et al. |
| 5,355,491 A | * | 10/1994 | Lawlor et al. ............... 717/147 |
| 5,488,727 A | | 1/1996 | Agrawal et al. |
| 5,598,560 A | | 1/1997 | Benson |
| 5,628,016 A | | 5/1997 | Kukol |
| 5,659,753 A | | 8/1997 | Murphy |
| 5,696,974 A | | 12/1997 | Agrawal et al. |
| 5,742,828 A | | 4/1998 | Canady et al. |
| 5,754,858 A | * | 5/1998 | Broman et al. ............. 717/111 |
| 5,768,595 A | | 6/1998 | Gillies |
| 5,778,233 A | | 7/1998 | Besaw et al. |
| 5,857,105 A | | 1/1999 | Ayers et al. |
| 5,918,235 A | | 6/1999 | Kirshenbaum et al. |
| 5,937,195 A | | 8/1999 | Ju et al. |
| 5,943,499 A | | 8/1999 | Gillies et al. |
| 5,966,702 A | | 10/1999 | Fresko et al. |
| 5,999,739 A | | 12/1999 | Soni et al. |
| 6,009,273 A | | 12/1999 | Ayers et al. |
| 6,041,179 A | | 3/2000 | Bacon et al. |
| 6,070,011 A | | 5/2000 | Liu et al. |
| 6,131,187 A | | 10/2000 | Chow et al. |
| 6,148,302 A | | 11/2000 | Beylin et al. |
| 6,149,318 A | | 11/2000 | Chase et al. |
| 6,151,703 A | | 11/2000 | Crelier |
| 6,182,284 B1 | | 1/2001 | Sreedhar et al. |

(Continued)

FOREIGN PATENT DOCUMENTS

| | | |
|---|---|---|
| EP | 0 463 583 | 1/1992 |
| EP | 0 665 493 | 8/1995 |
| EP | 0 757 313 | 2/1997 |
| EP | 1 049 010 | 11/2000 |
| WO | WO 01/48607 | 7/2001 |

OTHER PUBLICATIONS

M. R. Hartoog et al., "Generation of Software Tools from Processor Descriptions for Hardware/Software Codesign", 1997 ACM.*

(Continued)

*Primary Examiner*—Andy Ho
(74) *Attorney, Agent, or Firm*—Klarquist Sparkman, LLP

(57) ABSTRACT

Technologies are provided for automatically generating software development tool components and associated software development tools for a target architecture via a target architecture specification. Architecture-specific information can be compartmentalized from architecture-independent information. Accordingly, development components or tools can be easily generated for another target architecture by substituting a different target architecture specification.

32 Claims, 19 Drawing Sheets

U.S. PATENT DOCUMENTS

| | | | |
|---|---|---|---|
| 6,202,204 B1 | 3/2001 | Wu et al. | |
| 6,212,672 B1 | 4/2001 | Keller et al. | |
| 6,247,169 B1 | 6/2001 | DeLong | |
| 6,247,172 B1 | 6/2001 | Dunn et al. | |
| 6,249,910 B1 | 6/2001 | Ju et al. | |
| 6,253,304 B1 | 6/2001 | Hewitt et al. | |
| 6,286,134 B1* | 9/2001 | Click et al. | 717/138 |
| 6,289,446 B1 | 9/2001 | Nilsson | |
| 6,292,938 B1* | 9/2001 | Sarkar et al. | 717/138 |
| 6,330,717 B1 | 12/2001 | Raverdy et al. | |
| 6,353,924 B1 | 3/2002 | Ayers et al. | |
| 6,363,522 B1 | 3/2002 | Click et al. | |
| 6,374,368 B1 | 4/2002 | Mitchell et al. | |
| 6,381,738 B1 | 4/2002 | Choi et al. | |
| 6,412,020 B1 | 6/2002 | Leach et al. | |
| 6,412,109 B1 | 6/2002 | Ghosh | |
| 6,421,667 B1 | 7/2002 | Codd et al. | |
| 6,460,178 B1 | 10/2002 | Chan et al. | |
| 6,463,581 B1 | 10/2002 | Bacon et al. | |
| 6,481,008 B1 | 11/2002 | Chaiken et al. | |
| 6,484,312 B1 | 11/2002 | Morrison | |
| 6,487,716 B1 | 11/2002 | Choi et al. | |
| 6,526,570 B1* | 2/2003 | Click et al. | 717/146 |
| 6,560,774 B1 | 5/2003 | Gordon et al. | |
| 6,578,090 B1 | 6/2003 | Motoyama et al. | |
| 6,598,220 B1 | 7/2003 | Valys et al. | |
| 6,625,804 B1* | 9/2003 | Ringseth et al. | 717/114 |
| 6,625,808 B1 | 9/2003 | Tarditi | |
| 6,629,312 B1* | 9/2003 | Gupta | 717/136 |
| 6,634,023 B1 | 10/2003 | Komatsu et al. | |
| 6,662,356 B1 | 12/2003 | Edwards et al. | |
| 6,678,805 B1 | 1/2004 | Corduneanu et al. | |
| 6,745,383 B1 | 6/2004 | Agarwal et al. | |
| 6,748,584 B1 | 6/2004 | Witchel et al. | |
| 6,981,249 B1 | 12/2005 | Knoblock et al. | |
| 7,055,132 B2 | 5/2006 | Bogdan et al. | |
| 7,117,488 B1 | 10/2006 | Franz et al. | |
| 7,120,898 B2 | 10/2006 | Grover et al. | |
| 7,168,060 B2* | 1/2007 | Matsumoto et al. | 716/18 |
| 7,346,901 B2 | 3/2008 | Syme et al. | |
| 7,370,321 B2 | 5/2008 | Radigan | |
| 7,380,242 B2 | 5/2008 | Alaluf et al. | |
| 2002/0026633 A1 | 2/2002 | Koizumi et al. | |
| 2002/0059568 A1 | 5/2002 | Kawahito et al. | |
| 2002/0083425 A1 | 6/2002 | Gillies et al. | |
| 2002/0095667 A1 | 7/2002 | Archambault | |
| 2002/0166115 A1 | 11/2002 | Sastry | |
| 2002/0170044 A1 | 11/2002 | Tarditi | |
| 2003/0018961 A1 | 1/2003 | Ogasawara | |
| 2003/0101335 A1 | 5/2003 | Gillies et al. | |
| 2003/0101380 A1 | 5/2003 | Chaiken et al. | |
| 2003/0131147 A1 | 7/2003 | Wilt et al. | |
| 2003/0145312 A1 | 7/2003 | Bates et al. | |
| 2003/0217196 A1 | 11/2003 | Chan et al. | |
| 2003/0217197 A1 | 11/2003 | Chan et al. | |
| 2003/0226133 A1 | 12/2003 | Grover | |
| 2004/0015897 A1 | 1/2004 | Thompson et al. | |
| 2004/0025152 A1 | 2/2004 | Ishizaki et al. | |
| 2004/0049769 A1 | 3/2004 | Lueh et al. | |
| 2004/0093604 A1 | 5/2004 | Demsey et al. | |
| 2004/0095387 A1 | 5/2004 | Demsey et al. | |
| 2004/0098710 A1 | 5/2004 | Radigan | |
| 2004/0098724 A1 | 5/2004 | Demsey et al. | |
| 2004/0098731 A1 | 5/2004 | Demsey et al. | |
| 2004/0172639 A1 | 9/2004 | Luo et al. | |

OTHER PUBLICATIONS

"Common Language Infrastructure (CLI), Partition 1: Concepts and Architecture," ECMA TC39/TG3, Section 11.6, pp. 1-103, Oct. 2002.

"The LEX & YACC Page," http://dinosaur.compilertools.net/, 4 pages, website visited on Jun. 16, 2003.

"SMGN Reference Manual," http://suif.stanford.edu/suif/suif2/doc-2.20-4/, pp. 1-3, May 2003.

"Zephyr Abstract Syntax Description Language (ASDL): Zephyr ASDL," http://web.archive.org/web/19991103153820/http://www.cs.virginia.edu/zephyr/asdl.html, 1 page, Nov. 3, 1999.

"Zephyr Compiler Infrastructure: Zephyr: Tools for a National Compiler Infrastructure," http://web.archive.org/web/20000817014546/http://www.cs.virginia.edu/zephyr/, 1 page, Aug. 17, 2000.

"Zephyr Computer Systems Description Languages (CSDL): Generating Machine-Dependent Compiler Parts Using CSDL," http://web.archive.org/web/20000829045324/www.cs.virginia.edu/zephyr/csdl/, 1 page, Aug. 29, 2000.

"Zephyr Register Transfer Lists (RTLs): Compiling with Register Transfer Lists (RTLs)," http://web.archive.org/web/20000829045407/http://www.cs.virginia.edu/zephyr/rtl.html, 2 pages, Aug. 29, 2000.

"Zephyr Very Portable Optimizer (vpo): Machine-Independent Optimization," http://web.archive.org/web/20010424131242/http://www.cs.virginia.edu/zephyr/vpo/, 1 page, Apr. 24, 2001.

Adl-Tabatabai et al., "Code Reuse in an Optimizing Compiler," ACM SIGPLAN Notices, Proceedings of the Eleventh Annual Conference on Object-Oriented Programming Systems, Languages, and Applications, vol. 31, Issue 10, pp. 51-68, Oct. 1996.

Aigner et al., "An Overview of the SUIF2 Compiler Infrastructure," Technical Report, Computer Systems Laboratory, Stanford University and Portland Group, Inc., pp. 1-14, 2000.

Aigner, et al., "SUIF Compiler System: The SUIF Program Representation," Computer Systems Laboratory, Stanford University and The Portland Group, Inc., http://suif.stanford.edu/suif/suif2/doc-2.2.0-4/suifguide/, pp. 1-30, Aug. 14, 2000.

Appel et al., "The Zephyr Compiler Infrastructure," Internal Report, http://www.cs.virginia.edu/zephyr, Princeton University and University of Virginia, pp. 1-10, Nov. 6, 1998.

Ayers et al., "Scalable Cross-Module Optimization," ACM SIGPLAN Notices, Proceedings of the ACM SIGPLAN 1998 Conference on Programming Language Design and Implementation, vol. 33, Issue 5, pp. 301-312, May 1998.

Benitez et al., "Target-Specific Global Code Improvement: Principles and Applications," Technical Report CS-94-92, Department of Computer Science, University of Virginia, pp. 1-14, 1994.

Blickstein et al., "The GEM Optimizing Compiler System," Digital Technical Journal, vol. 4, No. 4, Special Issue, pp. 1-17, 1992.

Brooks et al., "Design of An Optimizing, Dynamically Retargetable Compiler for Common Lisp," Proceedings of the 1986 ACM Conference on Lisp and functional programming, pp. 67-85, Aug. 1986.

Devanbu, "Re-targetability in Software Tools," ACM SIGAPP Applied Computing Review, vol. 7, Issue 3, pp. 19-26, Sep. 1999.

Engler, "VCODE: A Retargetable, Extensible, Very Fast Dynamic Code Generation System," ACM SIGPLAN Notices, Proceedings of the ACM SIGPLAN 1996 Conference on Programming Language Design and Implementation, vol. 31, Issue 5, pp. 160-170, May 1996.

Ganapathi et al., "Retargetable Compiler Code Generation," ACM Computing Surveys (CSUR), vol. 14, Issue 4, pp. 573-592, Dec. 1982.

Goodenough, "Exception Handling: Issues and a Proposed Notation," Communications of the ACM, vol. 18, No. 12, pp. 683-696, Dec. 1975.

Guilan et al., "Retargetable Cross Compilation Techniques—Comparison and Analysis of GCC and Zephyr," *ACM SIGPLAN Notices*, Technical Correspondence, vol. 37, Issue 6, pp. 38-44, Jun. 2002.

Hayes et al., "Component Design of Retargetable Program Analysis Tools that Reuse Intermediate Representations," Proceedings of the 22nd International Conference on Software Engineering, Limerick, Ireland, ACM, pp. 356-365, Jun. 2000.

Heine et al., "Interprocedural Program Analyses," ACM SIGPLAN 2000 Conference on Programming Language Design and Implementation, Vancouver, B.C., 22 pages, http://suif.stanford.edu/suif/suif2/doc-2.2.0-4/tutorial/analysis.ppt, Jun. 2000.

Heine, "An Overview of the SUIF2 Base Infrastructure," ACM SIGPLAN 2000 Conference on Programming Language Design and Implementation, Vancouver, B.C., 30 pages, http://suif.stanford.edu/suif/suif2/doc-2.2.0-4/tutorial/basesuif.ppt, Jun. 2000.

Holzle et al., "OSUIF: SUIF For Objects," ACM SIGPLAN 2000 Conference on Programming Language Design and Implementation, Vancouver, B.C., pp. 1-17, http://suif.stanford.edu/suif/suif2/doc-2.2.0-4/ tutorial/osuif-intro.ps, Jun. 2000.

Kessler et al., "EPIC—A Retargetable, Highly Optimizing Lisp Compiler," ACM SIGPLAN Notices, Proceedings of the 1986 SIGPLAN Symposium on Compiler Construction, vol. 21, Issue 7, pp. 118-130, Jul. 1986.

Khedker et al., "Bidirectional Data Flow Analysis: Myths and Reality," ACM SIGPLAN Notices, vol. 34, No. 6, pp. 47-57, Jun. 1999.

Kienle, "OSUIF: A Closer Look," ACM SIGPLAN 2000 Conference on Programming Language Design and Implementation, Vancouver, B.C., pp. 1-31, http://suif.stanford.edu/suif/suif2/doc-2.2.0-4/ tutorial/osuif-detials.ps, Jun. 2000.

Knoop et al., "Lazy Code Motion," In Proceedings of the ACM SIGPLAN '92 Conference on Programming Language Design and Implementation, San Francisco, CA, 11 pages, Jun. 1992.

Knoop et al., "Partial Dead Code Elimination," In Proceedings of the ACM SIGPLAN '94 Conference on Programming Language Design and Implementation, 12 pages, Jun. 1994.

Lam, "An Overview of the SUIF2 System," ACM SIGPLAN '99 Conference on Programming Language Design and Implementation, Atlanta GA, 20 pages, http:suif.stanford.edu/suif/suif2/doc-2.2.0-4/ tutorial/suif-intro.ppt, May 4, 1999.

Lim, "Affine Partitioning for Parallelism & Locality," ACM SIGPLAN 2000 Conference on Programming Language Design and Implementation, Vancouver, B.C., 16 pages, http://suif.stanford.edu/suif/suif2/doc-2.2.0-4/-tutorial/affine.ppt, Jun. 2000.

Morel et al., "Global Optimization by Suppression of Partial Redundancies," Communications of the ACM, vol. 22, No. 2, pp. 96-103, Feb. 1979.

Ramsey et al., "Machine Descriptions to Build Tools for Embedded Systems," Proceedings of the ACM SIGPLAN Workshop on Languages, Compilers, and Tools for Embedded Systems, 17 pages, 1998.

Smith, "Machine SUIF," ACM SIGPLAN 2000 Conference on Programming Language Design and Implementation, Vancouver, B.C., 15 pages, Jun. 2000.

Stallman, "Using and Porting the GNU Compiler Collection," 504 pages, http://www.skyfree.org/linux/references/gcc-v3.pdf, Jul. 28, 1999.

Wegbreit, "Property Extraction in Well-Founded Property Sets," IEEE Transactions on Software Engineering, vol. 1, No. 3, pp. 270-285, Sep. 1975.

"Attribute-Based Templates for Microsoft .NET", 2001, newtelligence AG, 7 pages.

Tarditi et al.; "No Assembly Required: Compiling Standard ML to C"; Kluwer Academic Publishers, 1990; pp. 1-16.

Okasaki et al.; "Call-by-Need and Continuation-passing Style"; Lisp and Symbolic Computation: An International Journal; Kluwer Academic Publishers, 1993; pp. 1-25.

Johnson et al.; "Dependence-Based Program Analysis"; ACM SIGPLAN'93 PLDI, Jun. 1993; pp. 1-12.

Ayguadé et al.; "A Uniform Internal Representation for High-Level and Instruction-Level Tranformations"; 1994; pp. 1-25.

Weaver et al.; "Score: A Compiler Representation for Heterogeneous Systems"; Dec. 1995; pp. 1-14.

Saito et al.; "PROMIS IR Design"; Sep. 29, 1997; pp. 1-4.

Saito et al.; "PROMIS IR Implementation—AST Components—"; Sep. 29, 1997; pp. 1-4.

Polychronopoulos et al.; "The Promis Compiler Project—Annual Report"; Oct. 1, 1997; pp. 1-15.

Cho et al.; "High-Level Information—An Approach for Integrating Front-End and Back-End Compiler"; Aug. 1998; pp. cover page and 1-19.

Larus; "Whole Program Paths"; Proceedings of the SIGNPLAN'99 Conference on Programming Language Design and Implementation (PLDI 99), May 1999; pp. 1-11.

Fitzgerald et al.; "Marmot: An Optimizing Compiler for Java"; Technical Report MSR-TR-99-33; Jun. 16, 1999; pp. cover page and 1-29.

Fitzgerald et al.; "The Case Profile-Directed Selection of Garbage Collectors"; 2000; pp. 1-10.

"1.3 Compiler Architecture" http://lambda.uta.edu/cse5317/notes/node5.html visited on May 20, 2003; pp. 1-2.

"Implementation of a Parallelizing Compiler with a Universal Intermediate Representations: Translating of Source Codes into Universal Intermediate Representations" http://www.ipsj.or.jp/members/SIGNotes/Eng/22/1997/017/article004.html visited on May 20, 2003; pp. 1-2.

"Scale Download"; Dept. of Computer Science, University of Massachusetts Amherst; http://www-ali.cs.umass.edu/Scale/download.html visited on May 20, 2003; pp. 1-13.

"Overview of the SA-C Compiler" http://www.cs.colostate.edu/Cameron/compiler.html visited on May 20, 2003; pp. 1-2.

"PROMIS Release Announcement" http://www.csrd.uiuc.edu/promis/release_announcement.html visited on May 20, 2003; pp. 1-3.

"Scale"; Dept. of Computer Science, University of Massachusetts Amherst; http://www-ali.cs.umass.edu/Scale/ visited on May 20, 2003; pp. 1-46.

"CIL: Infrastructure for C Program Analysis and Transformation"; May 30, 2003; pp. 1-54.

"PROMIS Implementation—The Illinois-Irvine PROMIS Team" http://www.csrd.uiuc.edu/promis/ visited on Jun. 4, 2003; pp. 1-32.

"Illinois-Irvine PROMIS Compiler Internal Representation" http://www.csrd.uiuc.edu/promis/ visited on Jun. 4, 2003; pp. 1-17.

"Technical Overview" http://www.csrd.uiuc.edu/promis/overview.html visited on Jun. 4, 2003; pp. 1-2.

"A Parallelizing Compiler Framework" http://www.csrd.uiuc.edu/promis/home.html visited on Jun. 4, 2003; pp. 1-2.

"Demystifying .NET Compilation" http://www.zdnet.com.au/printfriendly?AT=2000035027-20264543, pp. 1-4, including 1 page of "Figure A", Apr. 12, 2002.

Harper et al., "Compiling Polymorphism Using Intensional Type Analysis", ACM Symposium on Principles of Programming Languages, pp. 130-141, Jan. 1995.

Tarditi et al., "TIL: A Type-Directed Optimizing Compiler for ML", 1996 SIGPLAN Conference on Programming Language Design and Implementation, pp. 181-192, May 1996.

Tarditi, "Design and Implementation of Code Optimizations for a Type-Directed Compiler for Standard ML", PhD Thesis, Carnegie Mellon University, 6 pages of introduction and pp. i-266, Dec. 1996 (Available as Technical Report CMU-CS-97-108).

Morrisett et al., "Stack-Based Typed Assembly Language", Xavier Leroy and Atsushi Ohori, editors, Lecture Notes in Computer Science, vol. 1473, pp. 28-52, Mar. 1998.

Colby et al., "A Certifying Compiler for Java", 2000 SIGPLAN Conference on Programming Language Design and Implementation, pp. 95-107, Vancouver, Canada, Jun. 2000.

Necula, "Compiling With Proofs", PhD thesis, Carnegie Mellon University, 27 pages, Sep. 1998.

Alpern et al., "Detecting Equality of Variables in Programs" Proceedings of the 15th ACM SIGPLAN-SIGACT Symposium on Principles of Programming Languages, pp. 1-11, 1988.

Bacon, "Fast and Effective Optimization of Statically Typed, Object-Oriented Languages", PhD thesis, Computer Science Division, University of California, Berkeley, 3 pages of introduction and pp. i-141, 1997.

Bodik et al., "ABCD: Eliminating Array Bounds Checks on Demand", Proceedings of ACM SIGPLAN 2000 Conference on Programming Language Design and Implementation, pp. 321-333.

Cytron, "Efficiently Computing Static Single Assignment Form and the Control Dependence Graph", ACM Transactions on Programming Languages and Systems, pp. 451-490, 1991.

Dean et al., "Optimizations of Object-Oriented Programs Using Static Class Hierachy Analysis", European Conference on Object-Oriented Programming, pp. 77-101, 1995.

Gay et al., "Fast Escape Analysis and Stack Allocation for Object-Based Programs", Proceedings of the 2000 International Conference on Compiler Construction, 12 pages, 2000.

Gupta, "Optimizing Array Bound Checks Using Flow Analysis", ACM Letters on Programming Languages and Systems, pp. 135-150, 1993.

Lengauer et al, "A Fast Algorithm for Finding Dominators in a Flowgraph", ACM Transactions on Programming Languages and Systems, pp. 121-141, 1979.

Mueller et al., "Avoiding Unconditional Jumps by Code Replications", Proceedings of the SIGPLAN '92 Conference on Programming Language Design and iMplementation, pp. 322-330, Jun. 1992.

Ruf, "Effective Synchronization Removal for Java", ACM SIGPLAN Conference on Programming Language Design and Implementation, pp. 208-218, BC, Canada, 2000.

Tarjan, "Testing Flow Graph Reducibility", Proceedings of the Fifth Annual ACM Symposium on Theory of Computing, pp. 96-107, 1973.

Vitek et al., "Efficient Type Inclusion Tests", Proceedings of OOPSLA '97, pp. 142-157, Atlanta, Georgia, 1997.

Sun Microsystems, Inc., "The Java Language Environment: 6—Security in Java, 6.3 The Byte Code Verification Process" http://web.archive.org/web/19990302092957/http://java.sun.com/docs/white/langenv/Security.doc3.html, 3 pages (Mar. 2, 1999).

Yellin, "Low Level Security in Java" http://web.archive.org/web/19990117003400/http://java.sun.com/sfaq/verifier.html 13 pages (Jan. 17, 1999).

ANDF Consortium, "ANDF Overview" http://web.archive.org/web/20021208181559/http://www.info.uni-karlsruhe.de/~andf/overview.htm, 2 pages (Dec. 8, 2002).

X/Open Company Ltd., "X/Open Preliminary Specification, Architecture Neutral Distribution Format (XANDF)"0 pp. 1-10 (X/Open Company Ltd. 1996).

Cedilla Systems Inc., Products http://web.archive.org/web/20010728193511/www.cedillasystems.com/pages/about/products.html, 2 pages (Jul. 28, 2001).

Lee, A Certifying Compiler for Java http://www-2.cs.cmu.edu/~petel/pcc/pcc-slides/SDIPOP.pdf, 10 pages (Sep. 2000).

Aho et al., "Compilers: Principles, Techniques and Tools", Copyright © 1986 by Bell Telephone Laboratories, Inc., cover and pp. ii, vii-x, 12-14, 463-512, and 585-722.

Appel, "Modern Compiler Implementation in ML", Copyright © Andrew W. Appel, 1998, Cambridge University Press, cover and pp. iv-viii, 148-210, 344-376, and 427-467.

Fraser et al., "A Retargetable C Compiler: Design and Implementation", Copyright © 1995 by AT&T and David R. Hanson, cover and pp. iv, vii-xii, 311-372.

Ramsey and Jones, "A single intermediate language that supports multiple implementations of exceptions," May 2000, ACM SIGPLAN Notices, PLDI 2000, vol. 35, Issue 5, ISBN:1-58113-199-2, pp. 285-298.

Choi et al., "Efficient and precise modeling of exceptions for the analysis of Java programs," Sep. 1999, ACM SIGSOFT Software Engineering Notes, PASTE '99, vol. 24, Issue 5, ISSN:0163-5948, pp. 21-31.

Hennessy "Program optimization and exception handling," Jan. 1981, Proceedings of the 8$^{th}$ ACM SIGPLAN-SIGACT symposium on Principles of programming languages, ISBN:0-89791-029-X, pp. 200-206.

Woo et al., "Alias analysis for exceptions in Java," Jan. 2002, Australian Computer Science Communications, ACSC2002, vol. 24, Issue 1, ISBN-ISSN:1445-1336, 0-909925-82-8, pp. 321-329.

Robillard et al., "Analyzing exception flow in Java programs," Oct. 1999, ACM SIGSOFT Software Engineering Notes, ESEC/FSE-7, vol. 24, Issue 6, ISBN:3-540-66538-2, pp. 322-337.

Gosling "Java intermediate bytecodes," Mar. 1995, ACM SIGPLAN Notices, IR '95, vol. 30, Issue 3, ISSN:0362-1340, pp. 111-118.

Burke et al., "The Jalapeño dynamic optimizing compiler for Java," Jun. 1999, Proceedings of the ACM 1999 conference on Java Grande, ISBN:1-58113-161-5, pp. 129-141.

Litwak, "Pure Java™ 2," Dec. 1999, Sams Publishing, ISBN:0-672-31654-4, Chapter 10.

Kienle, "A SUIF Java Compiler," Aug. 1998, University of California Santa Barbara, Technical Report TRCS98-18, Section 5.9, 6.9, 8.3, and 9.2.15.

"C/C++ Language Reference: try-except Statement," May 11, 2000, Microsoft Corp., accessed Jul. 10, 2005 at <http://msdn.microsoft.com/library/default.asp?url=/library/en-us/vccelng/htm/key_s-z_4.asp>, 2 pages.

International Search Report, Sep. 1, 2005, PCT/US04/15965, 13 pages.

Arnold et al., "Exploring the Interaction between Java's Implicitly Thrown Exceptions and Instruction Scheduling", International Journal of Parallel Programming, vol. 29, Issue 2, Apr. 2001, pp. 111-137.

Gupta et al., "Optimizing Java Programs in the Presence of Exceptions", 2000, Lecture Notes in Computer Science; vol. 1850, ISBN:3-540-67660-0, pp. 422-446.

Hamilton, "Technical correspondence: language integration in the common language runtime," ACM Press, Feb. 2003, ACM SIGPLAN Notices, vol. 38, Issue 2, pp. 19-28.

Tanenbaum et al., "A practical tool kit for making portable compilers," Communications of the Association for Computing Machinery, ACM, New York, NY, vol. 26(9):654-660, Sep. 1983.

Keller et al., "Binary Component Adaptation," European Conference on Object Oriented Programming (ECOOP), 12th European Conference Proceedings, Springer-Verlag Berlin, Germany, pp. 307-329, 1998.

Baum et al., "Generic components to foster reuse," Proceedings 37th International Conference on Technology of Object-Oriented Languages and Systems, Tools-Pacific 2000 IEEE Comput. Soc. Los Alamitos, CA, pp. 266-277, 2000.

Kiczales et al., "Aspect-oriented programming," ECOOP, 1241:220-242, Jun. 1997.

Chiba et al., "Josh: An Open AspectJ-like Language," Proceedings of the International Conference on Aspect-Oriented Software Development (AOSD), Lancaster, UK, pp. 102-111, Apr. 22, 2002.

European Examination Report, European Patent Application No. 04 014 358.8, 11 pages, dated Jun. 13, 2008.

Lidin, "Inside Microsoft® .NET IL Assembler," Microsoft Press, Overview, Table of Contents, Chapter 6—Namespaces and Classes—Enumerators, and Chapter 7—Primitive Types and Signatures—Primitive Types in the Common Language Runtime, 27 pages (Feb. 6, 2002).

Taft, "Programming the Internet in Ada 95," Ada-Europe, p. 1-19, (1996).

"Smalltalk: A White Paper Overview," Porter III, pp. 1-77, Mar. 2003.

* cited by examiner

FIG. 11

| Base Type | Prefix |
|---|---|
| Integer | x |
| Signed | i |
| Unsigned | u |
| Float | f |

FIG. 12

| Kind | Name |
|---|---|
| Immediate | *imm* |
| Literal value | lit |
| Register | *reg* |
| Register file | *regfile* |
| Relative code address | *reladdr* |
| Absolute code address | *absaddr* |
| Memory | *memclass* |

FIG. 18

Source:  z = a + b + c;  — 1800

IR:
t1 = ADD    a, b         — 1802
t2 = ADD    t1, c        — 1804
z = ASSIGN  t2           — 1806

Native:
t1(EAX), cc = x86add a(EAX), b(EDX)   — 1808
t2(EAX), cc = x86add t1(EAX), c(EBX)  — 1810
z = x86mov t2(eax)                    — 1812

GENERATING SOFTWARE DEVELOPMENT TOOLS VIA TARGET ARCHITECTURE SPECIFICATION

COPYRIGHT AUTHORIZATION

A portion of the disclosure of this patent document contains material which is subject to copyright protection. The copyright owner has no objection to the facsimile reproduction by any one of the patent disclosure, as it appears in the Patent and Trademark Office patent files or records, but otherwise reserves all copyright rights whatsoever.

COMPUTER PROGRAM LISTING APPENDIX

A portion of the disclosure of this patent document is submitted on one compact disc and is hereby incorporated herein by reference as Computer Program Listing Appendices A, B, and C. The Compact disc contains exactly three files, created Jun. 30, 2003, which are named: "AMD.md" (319 kilobytes in size) (Appendix A), "COMMON.md" (31 kilobytes in size) (Appendix B) and AMD EXPANSIONS.md" (4 kilobytes in size) (Appendix C). An additional, identical compact disc is also included.

TECHNICAL FIELD

The technical field relates to automated generation of software development tools such as compilers, debuggers, and optimizers.

BACKGROUND

Software development can be a difficult process involving a number of interwoven technologies. For example, software developers typically write software in human-readable source code which is converted into machine-readable object code by a compiler. After compilation, the developers may use a debugger to find errors in the code. Still other software development tools, such as optimizers, can be used as desired.

A typical software development technique is shown in FIG. 1. In the technique, unfinished software 104 is processed by various software development tools 106 (e.g., an optimizer 110A or a compiler 110B) to generate executable software 122, which is suitable for execution on a target architecture 132.

Software developers typically employ the software development tools 106 in an iterative process until the software is ready for execution. Over the lifetime of the software project, further enhancements, improvements, and optimizations can be made to the executable software 122.

Such software development tools can comprise various components, such as assemblers, disassemblers, decoders, encoders, instruction selection components, and instruction legalization components. Often, such components have overlapping requirements, and the components themselves may appear in more than one development tool (e.g., in a compiler and a debugger).

Despite the widespread necessity for similar component functionality, software development tool components are traditionally developed in isolation with little or no sharing of design or implementation. Each component for each tool on each architecture has its own implementation, resulting in much redundant work and duplicated code. Additionally, there may be little uniformity across architectures, even within the same source base. Therefore, any defects detected in the code of one component are corrected for a specific implementation, but the correction is not automatically propagated to other tools or architectures implementing the same functionality.

SUMMARY

Various technologies are provided for automatically generating software development tool components and software development tools via a target architecture specification. Architecture-specific information can be compartmentalized from architecture-independent information.

For example, a target architecture specification can be used for automated generation of a plurality of software development tool components for the architecture. Functionality shared by the components can thus be implemented once rather than re-implementing.

Also for example, after functionality for a particular target architecture is implemented as desired, developers can substitute a specification for another architecture in a technique sometimes called "retargeting." Retargeting for another architecture can be achieved easily and quickly because only the architecture-specific features need to be re-specified.

Also for example, a target architecture specification language can be used to specify the architecture-specific information in a target architecture specification. The language can facilitate a structure compact yet expressive enough to represent numerous different architectures. A common specification containing information that is of an architecture-independent nature can also be provided in addition to the target architecture specification.

By compartmentalizing architecture-specific and architecture-independent features, a system can markedly reduce the time spent developing or retargeting components and tools. Developers are thus able to spend more time enhancing the feature set of the components and associated tools; The result can be a richer, higher quality feature set for those developing software via the components and tools.

These and other aspects will become apparent from the following detailed description, which makes references to the accompanying drawings. The various technologies may be used separately and independently, or the various aspects may be used in any combinations or sub-combination.

BRIEF DESCRIPTION OF THE DRAWINGS

FIG. 11 shows various types and their prefix for use in a retargeting language.

FIG. 12 shows various possible operands and their respective names for use in a retargeting language.

FIG. 18 shows conversion of a source code statement into an intermediate representation ("IR") and conversion of the IR to native code.

DETAILED DESCRIPTION

Figure 1:
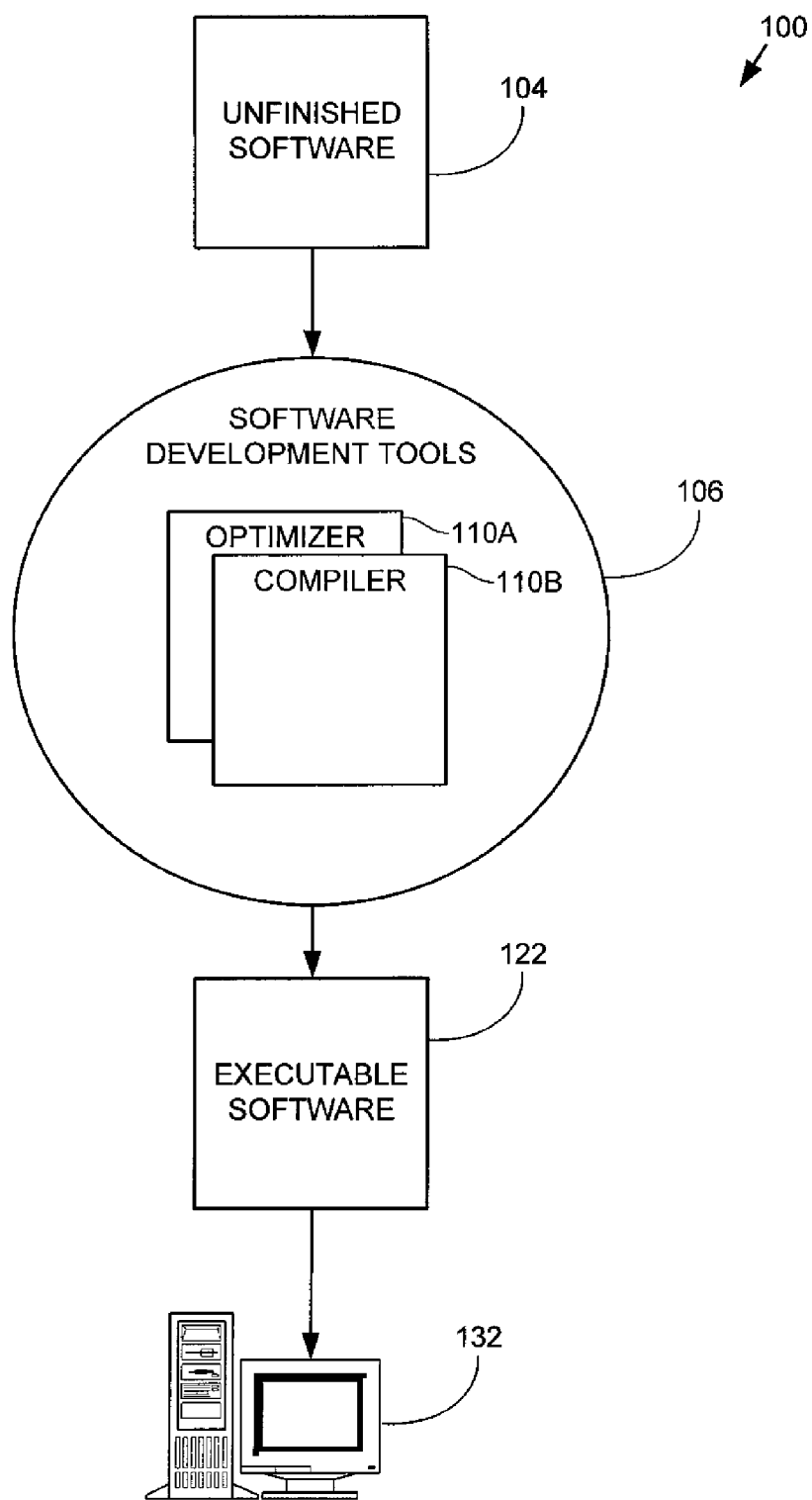
FIG. 1 is a block diagram showing an exemplary software development technique.

Various technologies automatically generate software development tools and components from a target architecture specification. In some examples, the specification contains the architecture-specific information necessary. to produce components that are useful in numerous compilers and related programming tools such as optimizers and debuggers. In some examples, a common framework is provided into which the architecture-specific components can be integrated to generate programming tools and components.

Exemplary Target Architectures

The target architectures described herein can include any of a variety of hardware machines or virtual machines. A target architecture can include any environment for executing code. Such architectures can include the Intel® x86, AMD, IAx, and MIPS architectures, as well as other architectures, including those hereafter implemented.

The Intel® x86 architecture includes, but is not limited to, any processor based on the Intel® x86 architecture, such as the 80x86, 80x88, Intel186, Intel286, Intel386, Intel486, and Pentium processors available from Intel Corporation. The AMD architecture includes, but is not limited to, the AMD64 and AMD32 architectures available from Advanced Micro Devices (AMD), Inc. The IAx architecture includes, but is not limited to, the IA32 and IA64 architectures available from Intel Corporation. The MIPS architecture includes, but is not limited to, the MIPS64™ and MIPS32™ architectures available from MIPS Technologies Inc.

Exemplary Software Development Tools

The software development tools described herein can include any of a variety of tools useful for developing software. Such tools may include compilers, debuggers, simulators, analysis tools, and optimizers.

Exemplary Software Development Tool Components

The software development tool components described herein can include computer-executable instructions, instructions compilable to computer-executable instructions, or data structures (e.g., tables) that can be integrated for use in or construction of any of the software development tools described herein.

Exemplary components include assembly components (e.g., for assembling instructions from assembly text), disassembly components (e.g., for listing an instruction as assembly text), encoding components (e.g., for encoding an instruction as binary), decoding components (e.g., for decoding instructions from binary), opcode selection components (e.g., for selecting an opcode), instruction legalization components (e.g., for enforcing instruction limitations), and various machine-specific tables (e.g., opcode, legalization, and register tables). Such components include any components also sometimes called "code generation components" because they themselves generate executable code or are used in various processes that ultimately generate executable code.

The components can be targeted for a particular target architecture. Any or all such software development tool components for one or more target architectures can be automatically generated via any of the technologies described herein. For example, automated generation (e.g., by software) of such components can be achieved via the frameworks and target architecture specifications described herein.

Exemplary Automated Software Development Tool Generation

Figure 2:
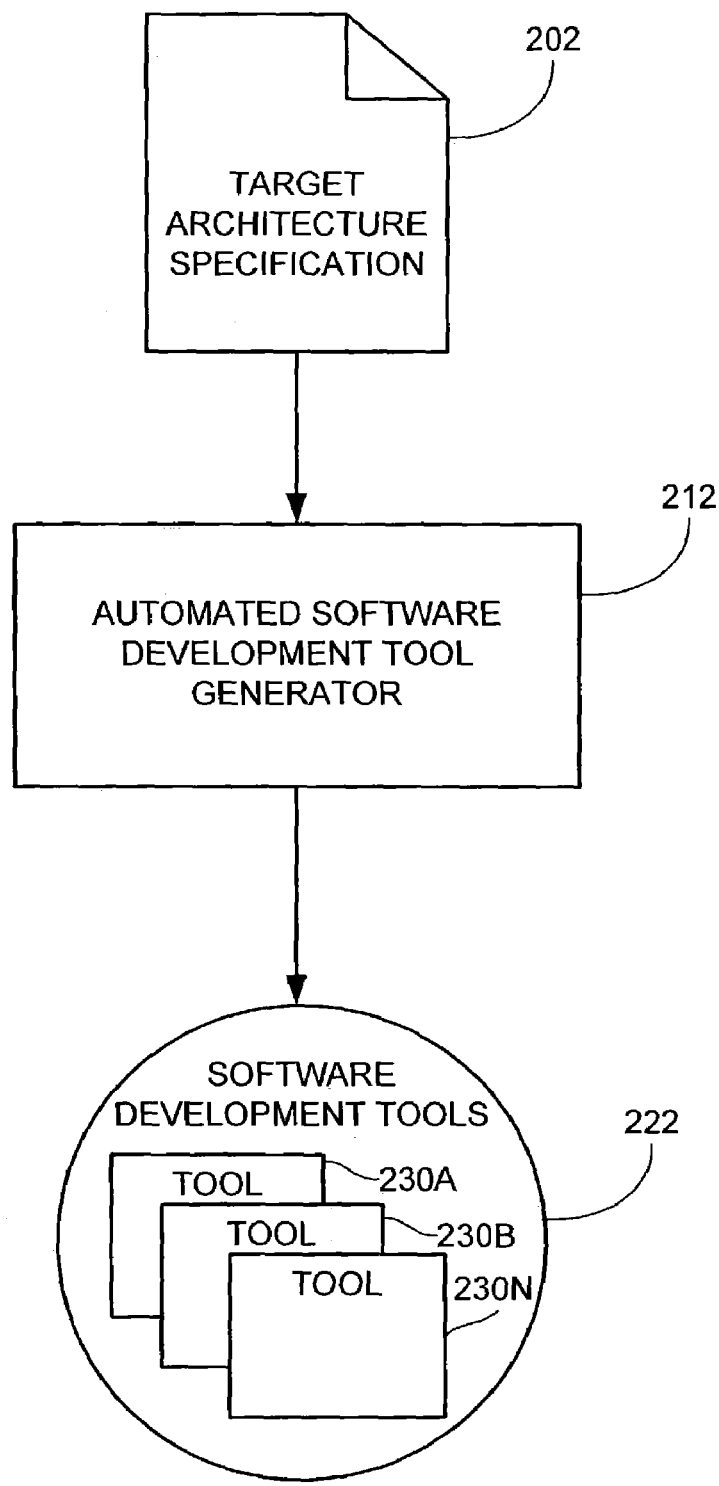
FIG. 2 is a block diagram showing automated generation of software development tools via a target architecture specification.

FIG. 2 is a block diagram showing automated generation of software development tools. In the example a target architecture specification 202 is supplied to an automated software development tool generator 212, which generates one or more software development tools 222 (e.g., the software development tools 230A, 230B, and 230N).

Automation can be achieved in a variety of ways. For example, the automated software development tool generator 212 can generate the tools 222 directly, generate source code that can be compiled by a compiler to generate the tools 222, or take some other approach.

Exemplary Automated Software Development Tool Generation

Figure 3:
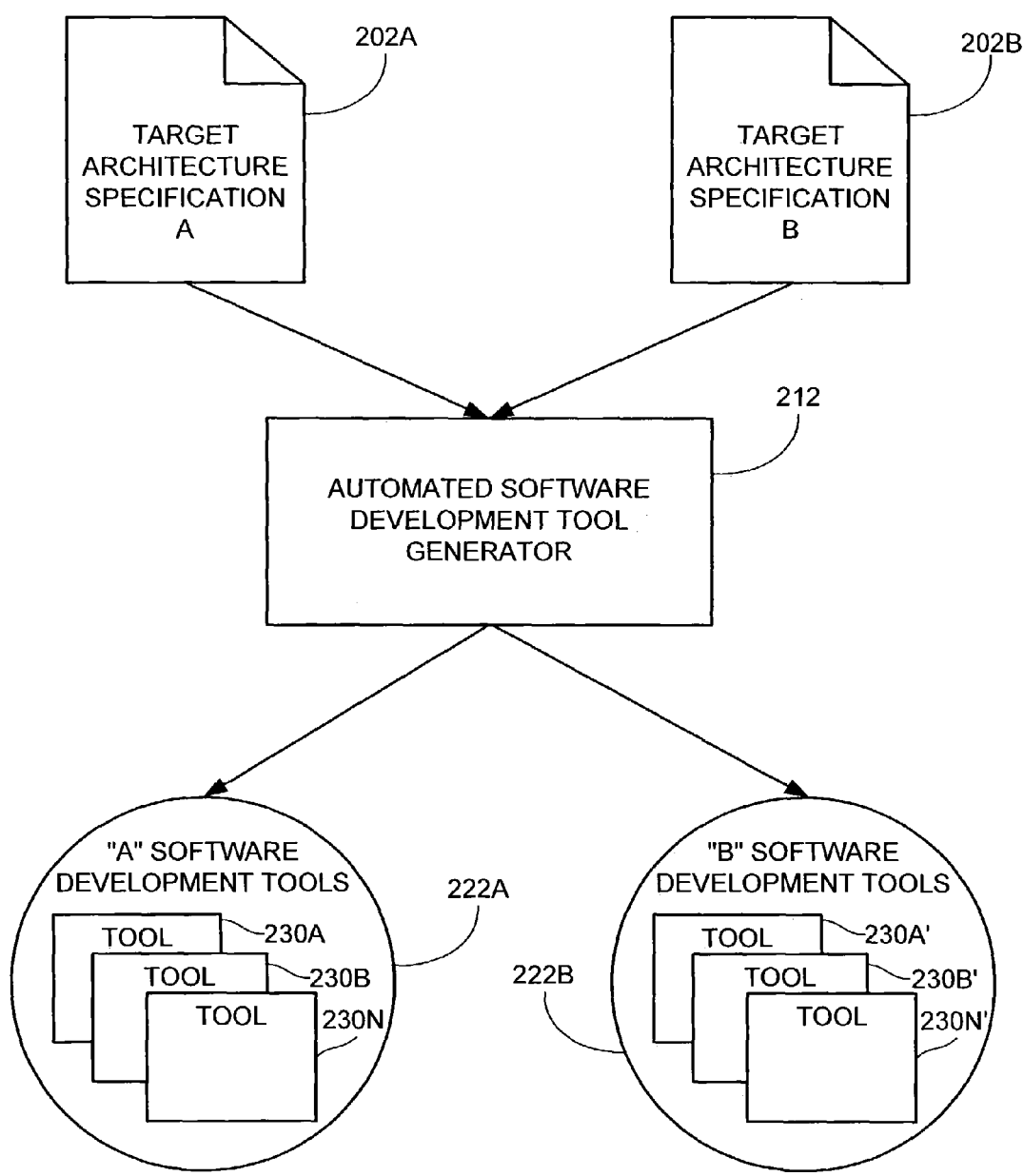
FIG. 3 is a block diagram showing generation of software development tools for more than one target architecture.

FIG. 3 is a block diagram showing generation of software development tools for more than one target architecture. In the example, a first target architecture specification 202A for a first target architecture is processed by the automated software development tool generator 212 to generate software development tools 222A for the first target architecture.

A second target architecture specification 202B for a second target architecture different from the first is processed by the same automated software development tool generator 212 to generate software development tools 222B for the second target architecture.

Such an arrangement is sometimes called "retargeting" because the generator 212 can be designed to work in concert with the specification 202A for a first target architecture. Upon reaching desired results via the first specification 202, creating development tools for a second target architecture merely involves supplying a different specification 202B. In fact, tools can be generated for any number of target architectures by supplying an appropriate specification to the automated software development tool generator 212.

If a software defect (e.g., bug) is detected in a particular development tool type across target architectures (e.g., for all target architectures), the automated software development tool generator or a part thereof (e.g., the frameworks described below) are suspect. Correcting the software defect in the appropriate framework can correct the software defect for the tool across related architectures.

Similarly, if developers of the automated software development tool generator 212 redesign it to incorporate enhanced functionality into the software development tools, the functionality can be easily propagated to other target architectures via the arrangement shown.

Figure 4:
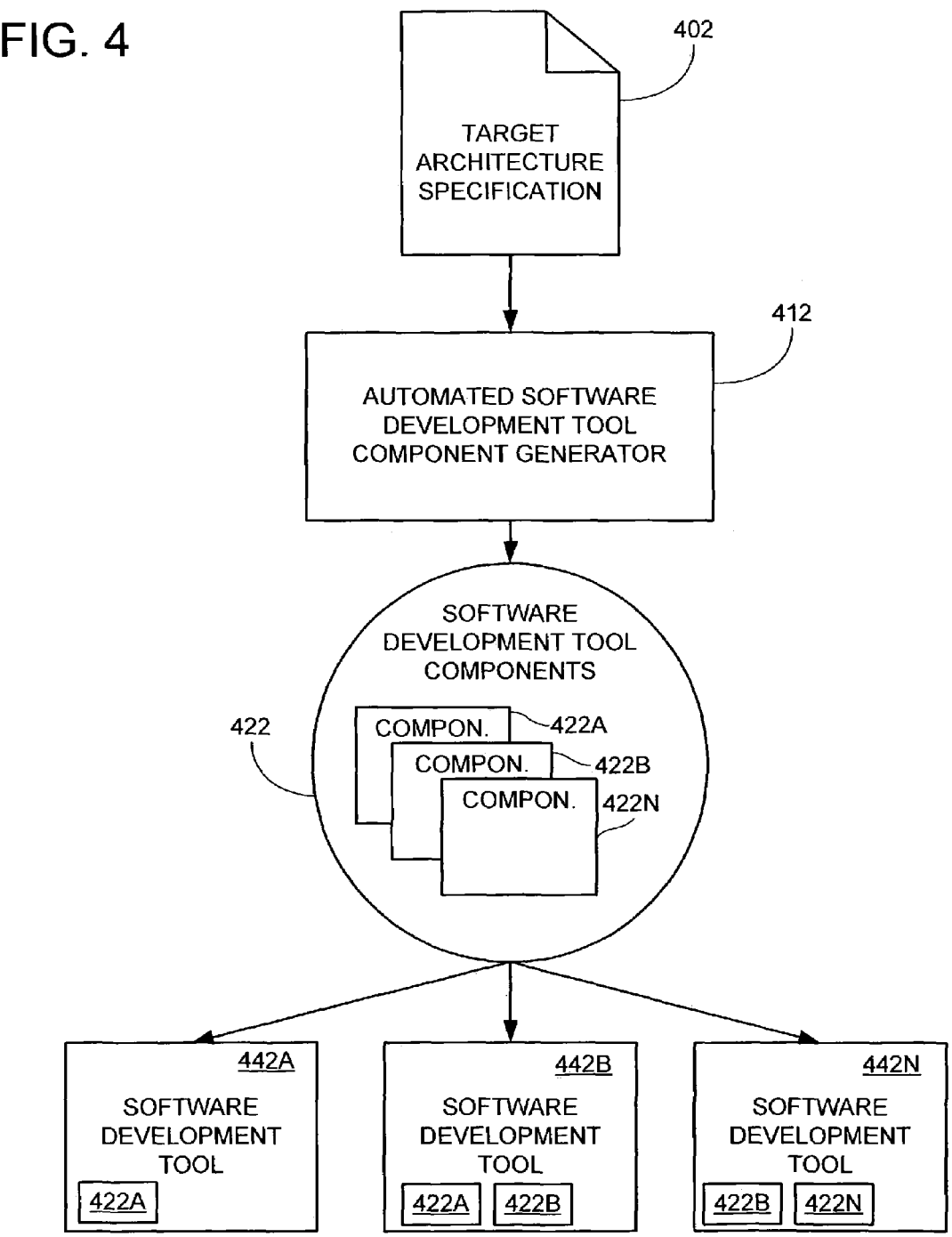
FIG. 4 is a block diagram showing automated software development tool generation via automated generation of software development tool components.

Exemplary Automated Software Development Tool Generation via Software Development Tool Components FIG. 4 is a block diagram showing automated software development tool generation via automated generation of software development tool components. In the example, a target architecture specification 402 is supplied to an automated software development tool component generator 412 (e.g., a subsystem of the automated software development tool generator 212 of FIG. 3), which generates various software development tool components 422 (e.g., component 422A, 422B, and 422N).

From the components 422, one or more software development tools 442A, 442B, and 442N are generated. In the example, functionality of the tools 442 overlaps, so some of the components 422 are shared (e.g., utilized in) by more than one tool 442. One or more of the software development tool components 422 can be utilized in one or more of the one software development tools 442.

When situations involving overlapping functionality are involved, software defects can be minimized because the functionality need not be developed more than once. Further, the developers of the automated software development tool component generator 412 can save time, rather than re-developing the overlapping functionality. The developers thus has extra time by which to further extend the functionality of the resulting tools 442, resulting in a richer, higher-quality feature set for the tools 442.

Figure 5:
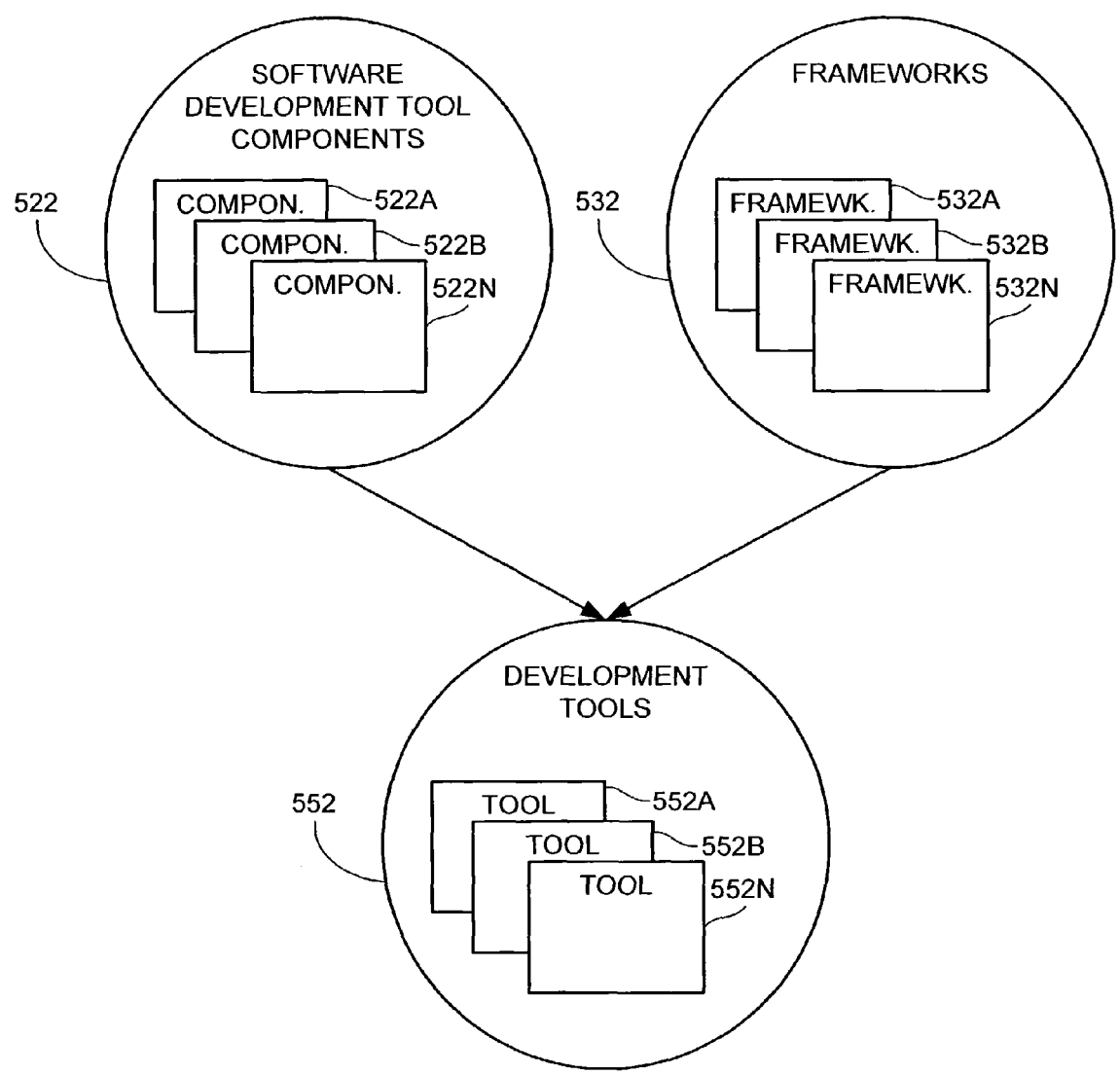
FIG. 5 is a block diagram showing use of frameworks for automated software development tool generation.

Exemplary Automated Software Development Tool Generation via Software Development Tool Components FIG. 5 is a block diagram showing use of frameworks for automated software development tool generation. In the example, one or more software development tool components 522 are integrated with one or more frameworks 532 to generate one or more development tools 552.

One or more frameworks 532 can be associated with a particular software development tool component. Alternatively, or in addition, one or more of the frameworks can be assembled to create one or more software development tools. A software defect discovered in a development tool type across target architectures (e.g., in two target architectures for the same tool) points to a defect in an associated framework. Correcting the framework may correct the defect across architectures.

Exemplary Target Architecture Specification

Figure 6:
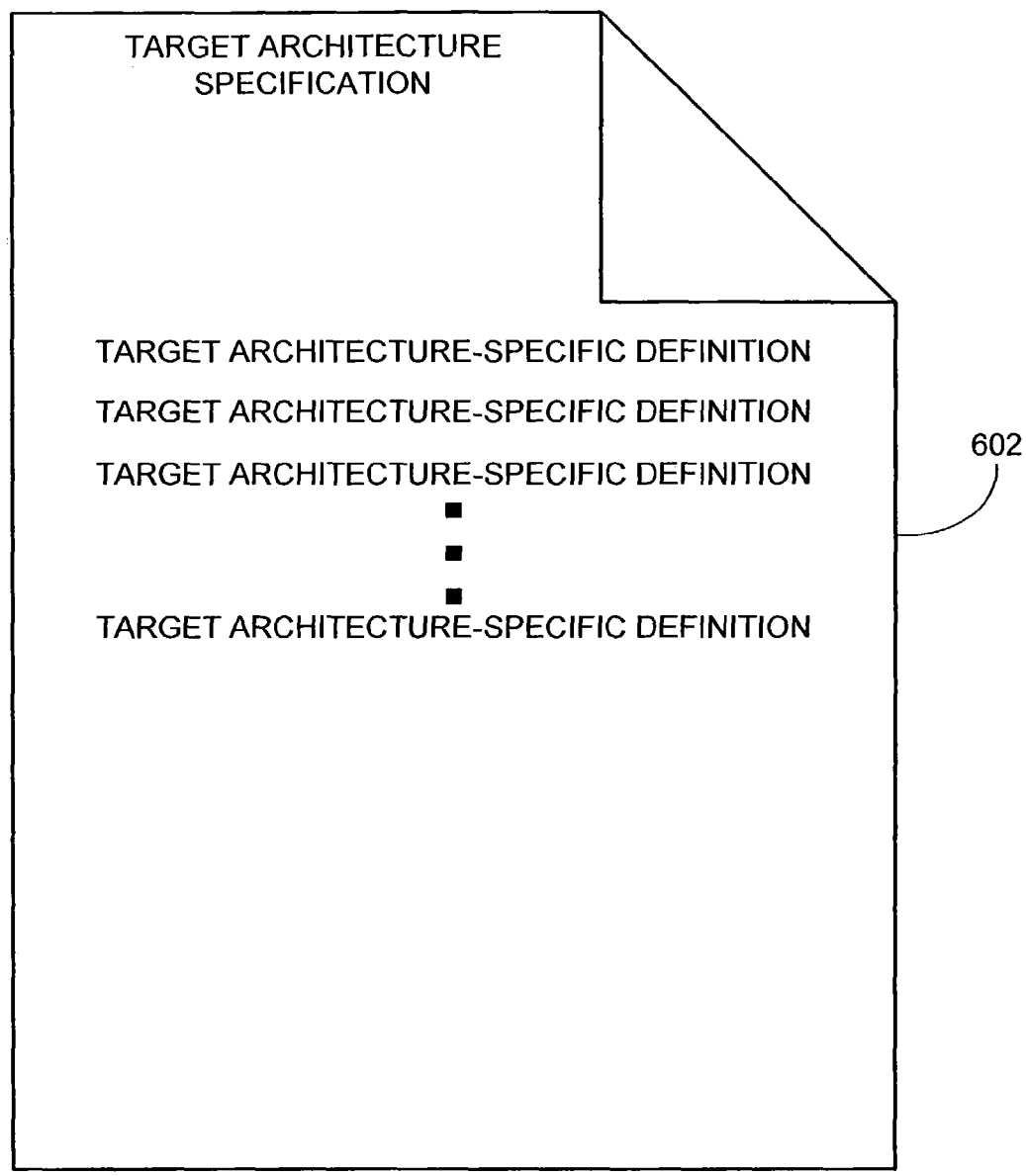
FIG. 6 is an exemplary target architecture specification.

FIG. 6 is an exemplary target architecture specification. In the example, the specification 602 includes a plurality of target architecture specific definitions for a single architecture. In any of the examples showing a target architecture specification, a supplemental specification can be supplied. For example, a supplemental specification can include definitions for elements common between architectures (e.g., shown in some of the examples as a file called "common.md").

The target architecture specification can take the form of computer-readable instructions stored in one or more computer-readable media (e.g., a file stored on a disk). The specification can consolidate description of architecture-specific features and be sufficient to generate software development tools for the target architecture when processed by the automated software development tool generator. The definitions of architecture-specific features in the specification can be sufficient to inform constructions of any of a plurality of software development components so that they function properly for the target architecture.

Architecture-specific logic can be compartmentalized (e.g., in the target architecture specification) from non-architecture-specific logic (e.g., in a framework). Such compartmentalization can result in a more efficient and higher-quality software development tool development process.

An exemplary target architecture specification in an exemplary target architecture specification language is shown in the file "AMD.md" incorporated herein from the attached compact disc. The file contents are shown in Computer Program Listing Appendix A attached hereto. The target architecture specification is directed towards the AMD architecture.

An exemplary supplemental specification including definitions for elements common between architectures is shown in the file "COMMON.md" incorporated herein from the attached compact disc. The file contents are shown in Computer Program Listing Appendix B attached hereto.

Exemplary Target Architecture Specification with Exemplary Sections

Figure 7:
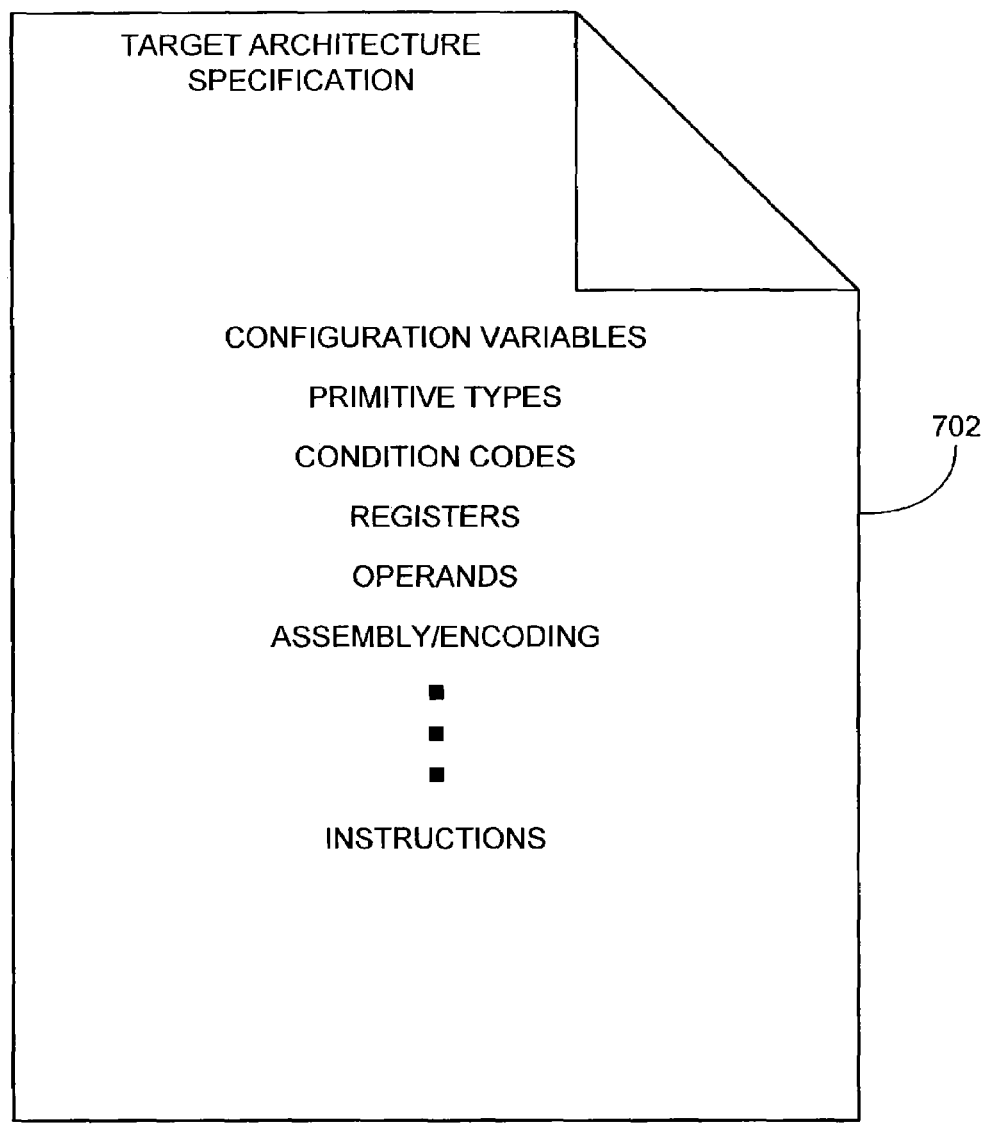
FIG. 7 is an exemplary target architecture specification showing exemplary sections thereof.

FIG. 7 is an exemplary target architecture specification showing exemplary sections thereof. In the example, the specification 702 is written in a specification language that accommodates one or more of the following sections: configuration variables, primitive types, conditions codes, registers, operands, assembly syntax, binary encoding, and instructions.

One or more other sections are possible, including sections for sub-instructions and properties. The language of the specification 702 is sometimes called a "meta-grammar" because it can be used to generate an appropriate grammar, from which software development tools can be generated (e.g., by grammar processing software).

Generating Tools for Plural Target Architectures

Figure 8:
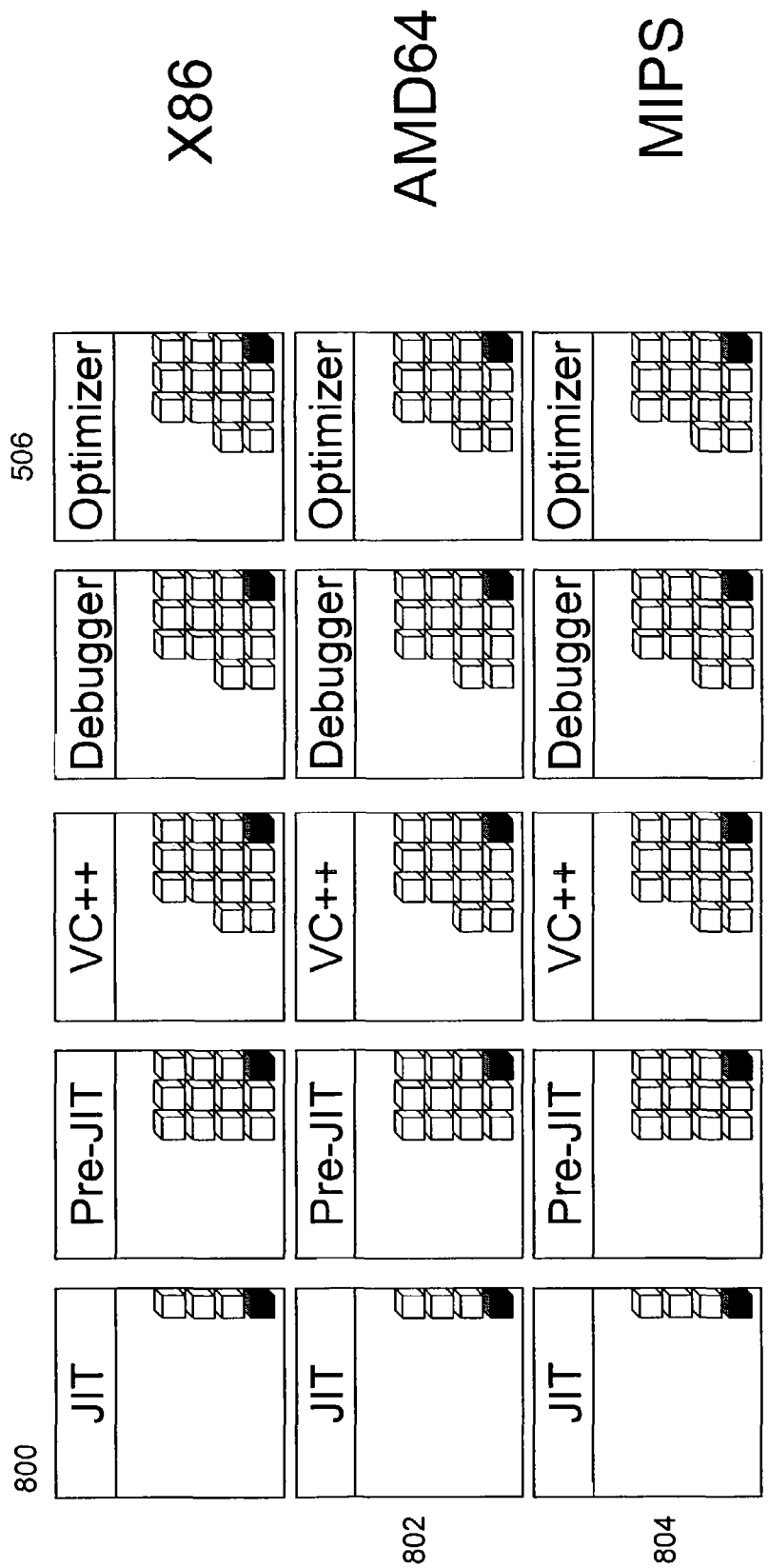
FIG. 8 shows a block view of JIT, Pre-Jit, and C++ native compilers, a debugger, and optimizer for each of three architecture types.

Software development tool components, or software development tools created using the technologies described herein can be quickly and easily retargeted for another architecture. For instance, FIG. 8 shows a block view of JIT, Pre-Jit, and Microsoft® Visual C++® native compilers, a debugger, and optimizer for each of three architecture types created using a system such as that shown in FIG. 4. Because the various compilers and tools for the architectures are built from common frameworks and target architecture specifications, the architecture-specific code for the software development tool supplied by the specification is compartmentalized from the non-architecture specific code that can be supplied either by the common framework or custom code. Therefore, components for the architectures can be the same in differing types of software development tools because they are created from the same specification.

Software development tools can be easily retargeted between different architectures because only the architecture-specific code need be changed, and bugs found in either the architecture specific or non-architecture specific code can be fixed over a large scale.

For example, assume a developer wishes to retarget the JIT compiler 800 for the Intel® x86 architecture such that it will function on the AMD or MIPS architectures. The developer need only write an appropriate target architecture specification for the AMD or MIPS architecture. The specification is provided to an automated software development tool generator (e.g., the generator 412, or "retargeting tool"), and the appropriate AMD or MIPS components for the JIT compiler are produced. These architecture-specific components are then integrated into the same or similar common framework used to create the JIT compiler 800 for the Intel® x86 architecture. The combined code is then compiled to create JIT compiler 802 for the AMD architecture, or JIT compiler 804 for the MIPS architecture.

Next, assume a developer finds a software defect in the optimizer 806 constructed using a specification written for the Intel® x86 architecture. If the software defect is found in the non-architecture specific code, the code is most likely part of the common framework. Therefore, the software defect may appear across the tools shown in FIG. 8.

Once a fix is developed in the common framework for the software defect, correction for the pictured fifteen tools (three compilers, two tools, for each of three different architectures) can be simultaneously initiated by implementing the fix in one source code (the common framework). Updated, corrected versions of the fifteen tools can be created by simply recompiling the specification for each architecture with the updated framework.

Similarly, if the software defect is found in the architecture-specific code of optimizer 806 for the Intel® x86 architecture, the software defect is most likely in the specification written for the Intel® x86 architecture. Again, fixing the software defect across the tools for the Intel® x86 architecture only requires correcting one source code (the Intel® x86 specification) and recompiling the updated specification with the common framework.

Exemplary System for Automated Generation of Software Development Tools

Figure 9:
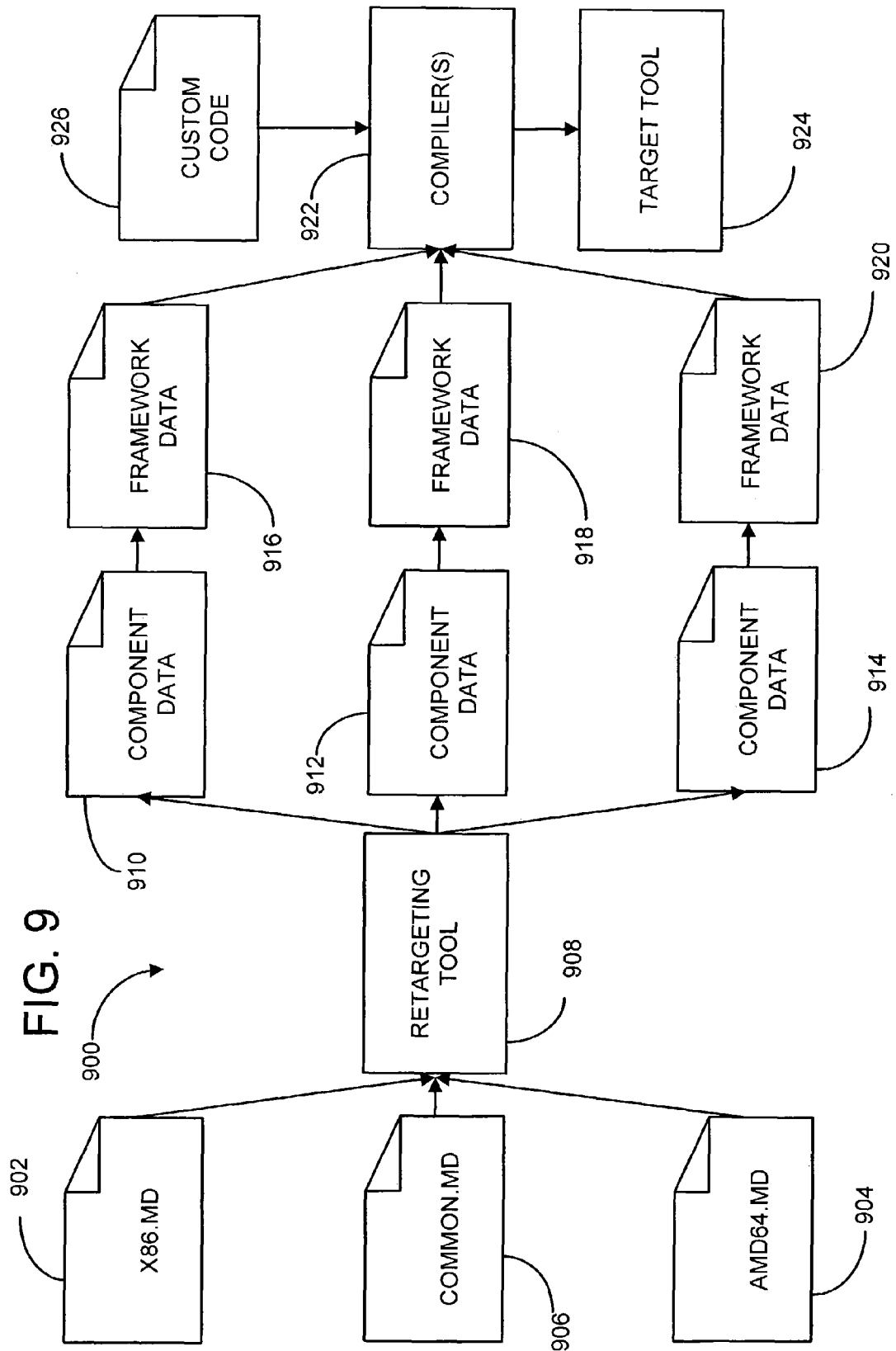
FIG. 9 illustrates one embodiment of a system for auto-generating software development tools.

FIG. 9 illustrates one embodiment of a system 900 for auto-generating software development tools and includes a software development tool component generator (sometimes called a "retargeting tool"). The system 900 can be used to generate any or all of the software development tool components described herein.

The target architecture specification 902 contains information describing the intermediate representation, assembly and encoding forms of instruction and registers for a specific target architecture (e.g., the Intel® x86 architecture). Likewise, another specification 904 can contain similar information for another target architecture (e.g., the AMD architecture).

The specification 902 is supplied to a software development tool component generator 908 that processes the specification in order to create component data 910-914, such as code fragments representing legalization tables, machine registers, instruction opcodes and their legal forms, etc., specific to one or more components useful for constructing software development tools.

The component data is then integrated into sections 916-920 of a common framework related to the specific component. For instance, component data 910 could represent code and/or tables containing the necessary data for implementing an encoder component on an Intel® x86 architecture. The component data 910 is integrated into a framework section 916 that generically represents the non-architecture specific data necessary for implementing an encoder. Once the component data 910-914 are integrated properly into sections 916-920 of the common framework, the integrated data is compiled in appropriate compiler(s) 922 to construct a software development tool 924 for a particular target architecture.

Alternatively, or in addition, a common architecture specification 906 can be supplied in order to provide the retargeting tool with information regarding the common framework. The common specification 906 can be processed by the retargeting tool 908 along with an architecture specification 902/904 in order to produce the components for constructing the target tool 924.

Alternatively, or in addition, a developer can add custom code to the process in order to customize the target compiler or tool 924. The custom code 926 is integrated into the framework 916-920 along with the component data 910-916 as shown in FIG. 9 and provided to the compiler(s) 922 in order to create the target tool 924.

Exemplary Custom Code

The language in which the target architecture specification is written can accommodate a wide variety of target architectures. In some cases, however, it may be desirable to include custom code beyond what the language can or should represent.

For example, in some cases, it may be desirable to include certain conventions that go beyond the architecture itself. For instance, a particular microprocessor (e.g., Intel® x86) may be implemented slightly differently for different operating systems. Certain conventions, such as how to pass function parameters on the stack, may be best represented in custom code rather than being incorporated in the target architecture specification.

In any of the examples described herein, the target architecture specification can be supplemented with custom code to be included in the resulting software development tool(s).

Exemplary Language for Target Architecture Specification

The following describes an exemplary language (sometimes called a "retargeting language") in which target architecture specifications can be written to employ any of the technologies described herein.

Symbols

Symbol names in the retargeting language can begin with an alphabetic or underscore (_) character. The rest of the characters may be alphanumeric or underscore.

Numeric Literals

Most numbers in the retargeting language can be explicitly based. The exceptions may be bit-sizes (for types, ranges and bit-size constraints) which can be represented in decimal. Three number bases are permitted in the retargeting language: binary, decimal, and hexadecimal. Numbers can be specified as a numeric value and a base suffix. For example: 1010*b*, 10*d*, and 0Ah specify the same value (10 decimal). Note that hexadecimal numbers beginning with A-F can be prefixed by 0 to disambiguate them from a symbol name.

Types

The retargeting language types can include (e.g., consist of) a base type and bit size. The bit size may be assumed decimal and may not be suffixed.

Operands

Operands can be specified with a kind and type, though in certain unambiguous contexts the type may optionally be omitted. Some kinds can be built-in and others, such as registers and register files, can be declared in the specification.

Keywords

A number of keywords can be reserved such that the retargeting tool can effectively process the specification without error. Symbolic identifiers can be restrained from having the same name as keywords as well. For example, the following words may be reserved for use by the retargeting language: action, asm, bitfield, condcode, configuration, constraints, decode, default, description, encode, enum, expansion, extern, form, get, immediateclass, instr, inverted, hir, lir, macro, memoryclass, meta, NULL, prefix, property, pseudo, put, registerclass, registerfile, remarks, required, reversed, sched, signed, subinstr, subreg, target, type, unsigned.

Object View

Figure 10:
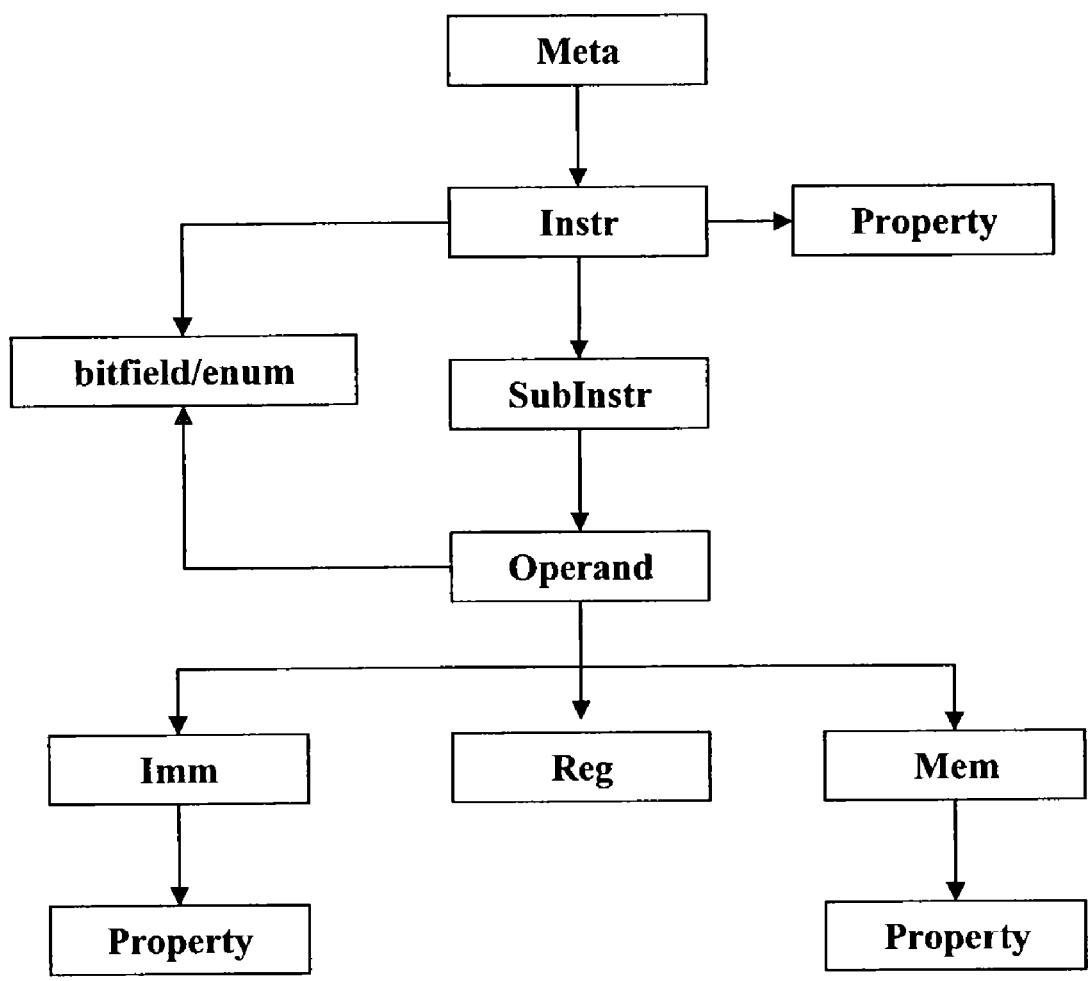
FIG. 10 illustrates an object view of one embodiment of a retargeting language.

An object view of the retargeting language is shown in FIG. 10. The figure illustrates the relationships between various constructs of the grammar. The retargeting language constructs can include (e.g., consist of) a declaration along with the legal forms of that construct. Form specifications can range from a single register to a set of constraining conditions. Additionally, constructs can have multiple forms, though there may be constraints as to how the forms may be used in conjunction with each other.

Form Fields

Object descriptions in the retargeting language can contain a list of legal forms for that object. Though the object forms themselves may be generally disjoint, many of the fields can be shared. The next few subsections describe the fields and where they may be applied. For purpose of example, fields are specified as the field keyword followed by the field data, if any, and terminated with a semi-colon:

asm "nop";

This fragment shows the assembly text for a nop instruction.

Assembly Text

The asm keyword can declare an assembly language text action for an object. asm operands may be quoted literal text, a specific register reference, or a form reference. The assembly action can be used both for assembling and listing. To make an object unavailable to the assembler and lister, a symbol can be used in conjunction with the keyword asm, such as an exclamation point. For instance, !asm would make the object unavailable to the assembler and lister.

Binary Encoding

The encode keyword can declare the binary encoding action for an object. encode operands may be a literal value, a specific register reference, or a form reference. The encode action can be used for both decoding and encoding. To make an object unavailable to the decoder and encoder, a symbol can be used in conjunction with the keyword encode, such as an exclamation point. For instance, !encode would make the object unavailable to the decoder and encoder.

Configuration Variables

The configuration keyword can be used to declare the configuration variables or define their values dependent on the location. When outside a target block, such as in common.md, configuration declares the configuration variables and their types:

```
configuration
{
    "Phx::BitSize" RegIntBitSize;
```

This fragment declares a variable called RegIntBitSize of type Phx::BitSize. The quotation marks can be useful in parsing complex type names. A simple type name may not need to be quoted.

Within a target block, configuration can define the variable values for that target:

```
target x86
{
    configuration
    {
        RegIntBitSize = 32d;
```

This fragment defines RegIntBitSize as 32 (decimal) for the Intel® x86 target.

Primitive Types

FIG. 11 shows various types and their prefix. Notice that there are three integer types: x, i, and u. i and u are explicitly signed and unsigned integers. These can be used where a distinction must be made. x is an "untyped" integer and indicates that either signed or unsigned values are fine; the distinction is not important. f is a float. The following fragment is an example of declaring the signed integer and void types:

```
type "i" : Int
{
    form "i" ;
}
type "void" : Void
{
    form " " ;
}
```

The first "i" is the framework dump display name, and the second is the retargeting language name. Note that void has no language name; it is not a valid type in the specifications. "Int" and "Void" are the framework source language types.

Condition Codes

Conditions code declarations specify the condition code name, and its inverted, reversed, signed and unsigned variants. Not all of these attributes need be valid for a given condition code. Any left off can be considered illegal.

```
condcode EQ
{
    inverted NE;
    reversed EQ;
    signed EQ;
    unsigned EQ;
}
condcode LT
{
```

```
        inverted GE;
        reversed GT;
        signed LT;
        unsigned ULT;
}
```

This fragment declares the equal and less-than condition codes.

Attributes

The bitfield and enum keywords can declare attributes of instruction opcodes or registers. bitfield differs from enum in that the enumerate values are powers of 2 rather than linearly increasing. Enums can have a 0 value of "_Illegal" automatically injected while bitfields receive "None" for 0.

Attributes declared in the retargeting language can be emitted as enumerations to the generated files for inclusion in the infrastructure. The enumeration can sometimes be defined outside the generated files. In such cases, extern can be placed before the enum or bitfield keyword.

There may be cases where it would be desirable to ensure an attribute is always specified. The required keyword will tell the retargeting tool to enforce the attribute's presence. The following fragment declares a register attribute called Attribute:

```
bitfield Reg.Attribute
{
    DontAlloc,
    ProfileInst,
    PostLinkInst
}
```

It can be usable in register declarations

Registers

The registerfile keyword can declare a homogeneous set of registers. The following fragment declares a register file referred to as "gr" in the specification:

```
registerfile gr
{
    type x64;
    form R[0 ... 63]
    {
        encode $@.w7 ;
    }
}
```

The register file has 64 registers, R0 through R63. The retargeting language can iterate over the range to generate the individual registers. The symbols $@ are replaced by the iteration value.

The above example may not apply to all platforms because many don't have a completely homogenous register file. On IA64, for example, R0 is hardwired to have a value of zero. As such, a register allocator shouldn't allocate it. Similarly, R12 is the stack pointer and should not be allocated. Therefore, a DontAlloc attribute can be declared. The Phoenix infrastructure register allocators will not allocate registers marked as such:

```
registerfile gr
{
    type x64;
    form R0
    {
        encode 0.w7 ;
            Attribute DontAlloc ;
    }
    form R[1 ... 11]
    {
        encode $@.w7 ;
    }
    form SP
    {
        encode 12.w7 ;
            Attribute DontAlloc ;
    }
}
```

Sometimes a register file is declared for infrastructure convenience, but has no registers that should be allocated. In that case, the DontAlloc attribute can be specified for the entire register file as a whole:

```
register drf
{
    type x7 ;
    Attribute DontAlloc ;
    form dummyReg
    {
        !asm ;
        !encode ;
    }
}
```

The dummyReg register may be for internal use only. In other words, it may not be available to the assembler or decoder and should not be present during the encoding and listing phases. Accordingly, !asm and !encode can be used in the dummyReg register form. In certain embodiments, the asm field can be made to default to the register form name. Therefore, register forms can (e.g. always) have an encode field. In other words, register forms have a real encode field or the !encode declaration.

The registerclass keyword can be used to "subclass" a registerfile with additional properties.

Memory

The memoryclass keyword can declare a set of memory forms. Memory forms often require more than one component to describe them. The property keyword can therefore be used to declare these components. A property declaration describes how to access the property with get and put source fragments, as well as the valid forms of that property. An example of declaring a set of memory forms may appear similar to the following example:

```
memoryclass mem
{
    type x8, x16, x32 ;
    property base
    {
        get { base = mem->Base; }
        put { mem->Base = base; }
        form gr.x64 ;
    }
    form default
```

```
    {
        asm "[" mem.base "]" ;
    }
}
```

Operands

Operands can be specified with a kind and type, though in certain unambiguous contexts the type may optionally be omitted. The kinds can be built-in, or alternatively, other kinds such as registers and register files can be declared in the specification. FIG. 12 shows various possible operands and their respective names as explained further below.

Immediate Operands

An immediate operand is a numeric literal that appears in assembly and encoding actions. Numeric literals may have base types of i, s, u, or f. Immediate operands may be "subclassed" via the immediateclass keyword.

Literal Values

The literal value operand kind is provided as a convenience to the writers of the architecture specifications. It is used by the retargeting tool when processing sub-instructions as a means of reducing the number of redundant rules (or extremely similar rules—differing solely by numeric literal constants.) Literal value operands may only appear as formal parameters in subinstr declarations. Any references to a subinstr with literal value formals should have numeric literals as the actual parameters.

Memory Operands

Memory operands specify any type of memory reference that the machine supports. The property keyword can be used to declare the memory reference components valid for the machine. Memory operands will not appear without a property specification in asm and encode actions.

Register and Register File Operands

Register and register file operands can be specified according to the names in the register declaration sections. Register operands indicate that an operand must be a specific register. Register file operands indicate that an operand may be any register from the register file.

Assembly and Encoding Actions

Assembly and encoding forms can be tied to the intermediate representation ("IR") with action lists. An action list comprises of one or more actions. Many action kinds are common to asm and encode, however, the literal actions may different due to the context.

Operand Action

An operand action is simply an operand specification. When in an asm action list, the appropriate textual representation of the operand is selected. For encode action lists, the encoding representation is used. On the encode action list, operands may be split into several fields via a bit-range specification. As an example, splitting imm2.i32 (32-bit immediate) into two 16-bit fields would be done as imm2.i32[0..15] and imm2.i32[16..31]. It is worthy, note that the range numbers need not suffixed. They are implicitly decimal. [high..low] and [low..high] are both valid and equivalent specifications.

Literal Constant Action

For asm, a quoted text literal can be permitted. For encode, a numeric literal constant may be specified. As above, the encoding value may be split into bit-fields with a bit-range specification.

Subinstr Reference Action

A subinstr reference is similar to a function call in most languages. The subinstr name is followed by a parameter list. Logically, the asm/encode action lists of the subinstr are inserted inline in place of the subinstr reference.

Register Declarations

Registers are grouped by register files.

Register Files

A register file section can describe a group of registers that are generally interchangeable. In other words, if register A can be used in the same contexts as register B, then A and B belong to the same register file. The register file declaration can include a list of types valid for the registers belonging to that file. These types are used primarily by the register allocation phases and the retargeting tool itself.

```
registerfile prefix
{
    type primary-type ;
    constraint type-list ;
    form reg { reg-info-list }
    ...
}
``` prefix is an alphabetic prefix that will be used to specify the register file elsewhere in the grammar.

type is the primary type of the register file.

type-list is a comma-delimited list of types valid for this register file (in addition to the primary type.)

reg is the register name.

reg-info-list is a list of one or more semi-colon delimited info fields describing the register.

asm "text" specifies the assembly language text for this register. This field can default to the reg form value.

encode value specifies an encoding value for the register.

attribute register-attribute-list specifies a comma delimited list of as defined by register bitfield and enum attribute declarations.

subreg parentReg[s..e] specifies that this register does not exist on its own, but rather is a part of another register. s and e specify the starting/ending bits (from low to high) of this subregister. The subregister inherits attribute from the parent if they are not explicit in the form.

To specify a range of numbered registers that are similar, range syntax [start..end] can be used. The range is specified after the reg name (e.g. r[0..7].) Wherever the number would normally appear, the $@ symbol is used. Continuing the previous example, encode $@ would generate encodings of 0d, 1d, . . . 7d for registers named r0, r1, . . . r7 respectively.

Scheduling Structure Declaration

The sched section can declare the scheduling structure fields. The section format is similar to a C++ structure declaration and follows:

```
sched
{
    field-type field-name ;
    ...
}
```
field-type is a C++ language variable type.
field-name is a C++ language variable name.

Property Declarations

Instructions and certain operand kinds can be extended through properties. A property declaration can name the property, the context where it is valid, the get and put actions, and a list of valid forms:

```
property [context.]name
{
    get { action }
    put { action }
    form numeric-value { form-info }
    form "named-constant"      { form-info }
    form imm.type ;
    form reg ;
    form regfile ;
}
``` context is an optional context which may be instr for instruction properties.

For other properties, context may be inferred from the surrounding declaration.

name is the name for the property. Properties can be referenced as context.name or name action is source code to perform the appropriate action. Within the action string, name can be assigned to 'for get' actions and assigned from 'for put' actions.

Similarly, context should be referenced as the "object" that is operated on.

numeric-value is a numeric literal specified as noted earlier. This form can be selected when the property value equals the numeric value. If any form has a numeric-value selector, other forms should also.

"named-constant" is a quoted text string. The quotes may be required for syntactic purposes only. The string can be thought of as a named source code constant (e.g. enumeration value) and will appear in the generated code without the quotes. This form can be selected when the property value equals the named constant. If any form has a named-constant selector, other forms should also.

reg can be any valid register name. The form can be selected when the property value is the specified register. reg selector forms may be used in conjunction with other reg selectors from the same register file as well as regfile selector for the containing register file.

regfile can be any declared register file prefix. The form can be selected when the property value is any register from the specified register file. regfile selector may be used with reg selectors from the specified register file.

imm can be an immediate value specified, as noted early. The form should be the only form allowed for the property and specifies a sized immediate value is legal for the property.

form-info can specify the asm and encode actions associated with the form.

These can be optional for reg, regfile and imm forms if default actions for these selectors already exist either explicitly in the machine description (reg) or implicitly in the retargeting language (imm.).

Sub-instruction Declarations

Subinstrs are a means of reducing redundancy in the specification by factoring forms common to several instructions. They represent parts of instructions and need not accomplish any function on their own.

```
subinstr name ( param-list )
{
    form constraint-list { info-list }
    form default { info-list }
}
``` name can be the name for the subinstr.

param-list can be a list of parameters to the rule specified as operands.

constraint-list can be a list of constraints that must be satisfied for this form to be selected. A constraint is specified as object(value). Note the use of object in place of param. This is to reflect that a property reference may appear. There are five categories of constraint determined by value: NULL, reg, !reg, *, numeric literal, and |bit-size|. The first three categories are for use with registers (register parameters and properties that are registers). NULL specifies that the object must not be present. reg specifies that the object must be a certain register. !reg specifies that the object may not be a certain register. * indicates that the object must be present, but can be any register. numeric literal specifies that the object must have an exact value. |bit-size| indicates that the object must be encodable with bit-size bits. Note that numeric literal is a number plus a base suffix whereas bit-size has no suffix since it is a size in bits.

info-list contains asm and encode action lists.

Forms, if they will be evaluated in the order they are specified in the specification file, should be ordered from most constraining to least.

Instruction Declarations

Each machine instruction can be described by an instr section which contains one or more legal instruction forms. The instr section format is as follows:

```
instr opcode : IrKind
{
    common-info-list
    form opnd-list = opcode opnd-list
    {
        form-info-list
    }
    ...
}
``` opcode can be the machine dependent opcode, may have an exception to the general symbol name conventions described previously.

common-info-list can be a list of one or more semi-colon delimited info fields describing the instruction.

attribute instr-attribute-list specifies a comma delimited list of attributes as defined by instruction opcode bitfield and enum attribute declarations.

sched sched-field-values sched-field-values is a list of one-or-more comma delimited scheduling structure initializations of the form field (value) where field is a field declared in the sched section.

form-info-list is similar to common-instr-info-list with two additional info types:

asm action-list specifies the assembly syntax.

encode action-list specifies an encoding rule for the instruction form.

encode pseudo form pseudo-form specifies another instruction's form to use when encoding this instruction form.

The form declaration specifies a legal IR form of the instruction.

opnd-list specifies zero or more comma delimited instruction operands. There are three operand forms: bindable, naked bindable and naked non-bindable.

Bindable operands are the normal case. These are required operands that receive the primary result(s) and are used to perform the primary function of an opcode, e.g. the first dest and first two sources of an add instruction. They are specified as opnd-kind number.opnd-type. Bindable operands, for purposes of this embodiment, must be numbered linearly starting from 1.

Naked bindable operands represent secondary effects of instructions, e.g. the Intel® x86 mul instruction sets EAX to the lower 32-bits and EDX to the upper 32-bits. It is used for both 32-bit and 64-bit multiplies. Since a 32-bit multiply doesn't care about the upper 32-bits, a second dest will not be present. In this case, EDX represents a naked bindable operand. These operands are specified as physical-register.opnd-type. Examples: EDX.i32, R1.i64. Indirections may also be specified as +[physical register].opnd-type. For example: +[ESP].i32.

Naked operands represent instruction side-effects that are not generally used other than modeling the machine state. E.g. the Intel® x86 push instruction affects the ESP register. These operands are specified as —physical-register.opnd-type. Examples: -ESP.i32, -B0.i64. Indirections may also be specified as —[physical register].opnd-type. For example: -[ESP].i32.

Expansions

An expansion is similar to what is commonly known as an intrinsic function. High-level programming languages often include intrinsic, or built-in, functions that programmers use for common or repetitive functionality. Rather than having to explicitly define or call a library to implement the functionality, it is already known and implemented at compile-time.

Likewise, the retargeting language can include expansions to allow an author of a specification to explicitly define a declaration, function, code fragment, etc. and then refer to the expansion whenever its functionality is desired in the specification. The retargeting tool will then treat the reference as another instance of the explicitly defined expansion.

Expansion Declarations

```
expansion form opnd-list = opcode opnd-list
{
    instr
    instr
    instr
    . . .
}
``` instr can be any valid instruction form as described earlier.

An exemplary set of expansions is shown in the file "AMD EXPANSIONS.md" incorporated herein from the attached compact disc. The file contents are shown in Computer Program Listing Appendix C attached hereto. The exemplary set of expansions is directed towards the AMD architecture.

Figure 13:
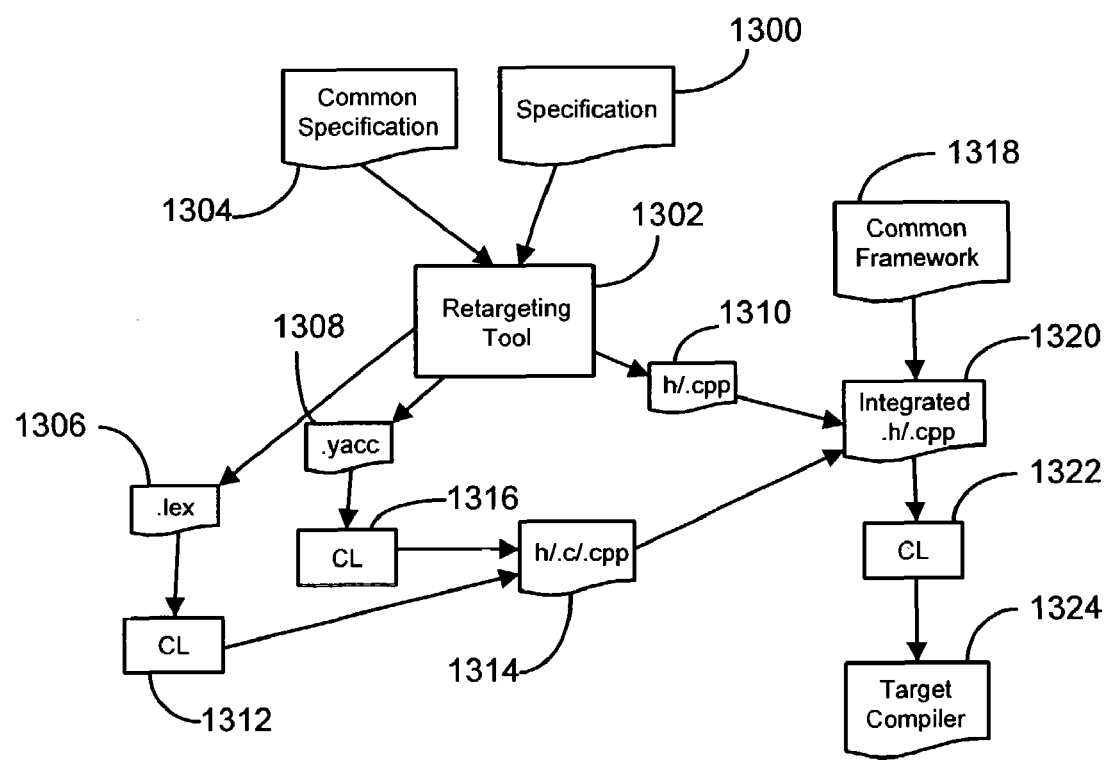
FIG. 13 illustrates an alternative implementation of an automated software development tool generation system.

Exemplary Alternative Implementation of Automated Software Development Tool Generation Another embodiment of a system for automated software development tool generation is illustrated in FIG. 13. In the example, a target architecture specification 1300 with architecture specific data is supplied to a retargeting tool 1302. Alternatively, both the specification 1300, and a second specification 1304 with non-architecture specific data, can be supplied to the retargeting tool 1302.

The retargeting tool 1302 is software that parses the specification(s) 1300/1304 provided for data relating to one or more code generation components. Based upon the data in the specification(s) 1300/1304, the retargeting tool creates one or more components. Each component provides data creating code generation components.

For instance, in the embodiment of FIG. 13, a tokenization grammar 1306 (e.g., in lex format), and a parser grammar 1308 (e.g., in yacc format), and series of C source and header files 1310 are produced.

In an example using lex, the tokenization grammar 1306 is provided to a lex compiler 1312 for creating the source code and header files 1314 necessary to produce a lexical analysis component of a compiler. Lex is a language designed specifically for creating compiler lexical analysis components.

In an example using yacc, the parser grammar 1308 is provided to a yacc compiler 1316 for creating the source code and header files 1314 necessary to produce a syntactical analysis component of a compiler. Yacc provides a general tool specifying the structures of source code input, together with code to be invoked as each such structure is recognized.

The source code ultimately responsible for producing the components necessary for building the software development tool is produced by integrating the series of C source and header files 1310/1314 produced by the retargeting tool with the common framework 1318. For instance, lexical and syntactical analysis components are produced by compiling the integration of the series of C source and header files 1314 with common framework source code and the header files 1318. Likewise, other software development tool components can be produced by compiling the integration of the series of C source and header files 1310 with common framework source code and header files 1318.

Thus, the source code 1320 representing an integration of C source and header files 1310/1314 and common framework source code and header files 1318 is provided to compiler 1322 to produce the compiler 1324 targeted for the architecture described in specification 1300, that conforms to the common framework.

Exemplary Legalization Tables

As described above, software development tool components include legalization tables. Such tables include information sufficient to identify the specific: form of a target instruction. The legalization framework can provide a form index that is used by the instruction selection, instruction legalization, encoding, and listing components.

Methods for Auto-Generating Code Generation Components

Figure 14:
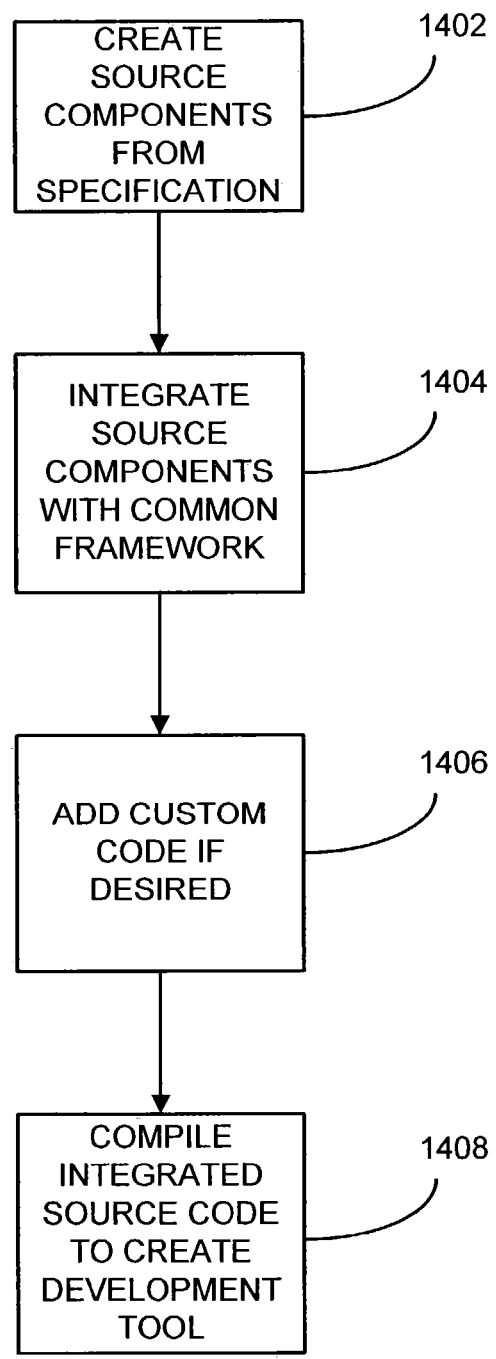
FIG. 14 is a flowchart of one embodiment of a method for auto-generating code generation components.

FIG. 14 is a flowchart of an embodiment of a method implemented in software for auto-generating code generation components suitable for use with the technologies described herein. A target architecture specification is processed at 1402 to create a number of components represented by source code. The source components are then integrated into a framework represented by source code at 1404. If desired, custom code can be included as well at block 1406. The integrated source code is then compiled at block 1408 to create a software development tool from the code generation components.

Developer Methods for Retargeting and Updating Code Generation Components

Figure 15:
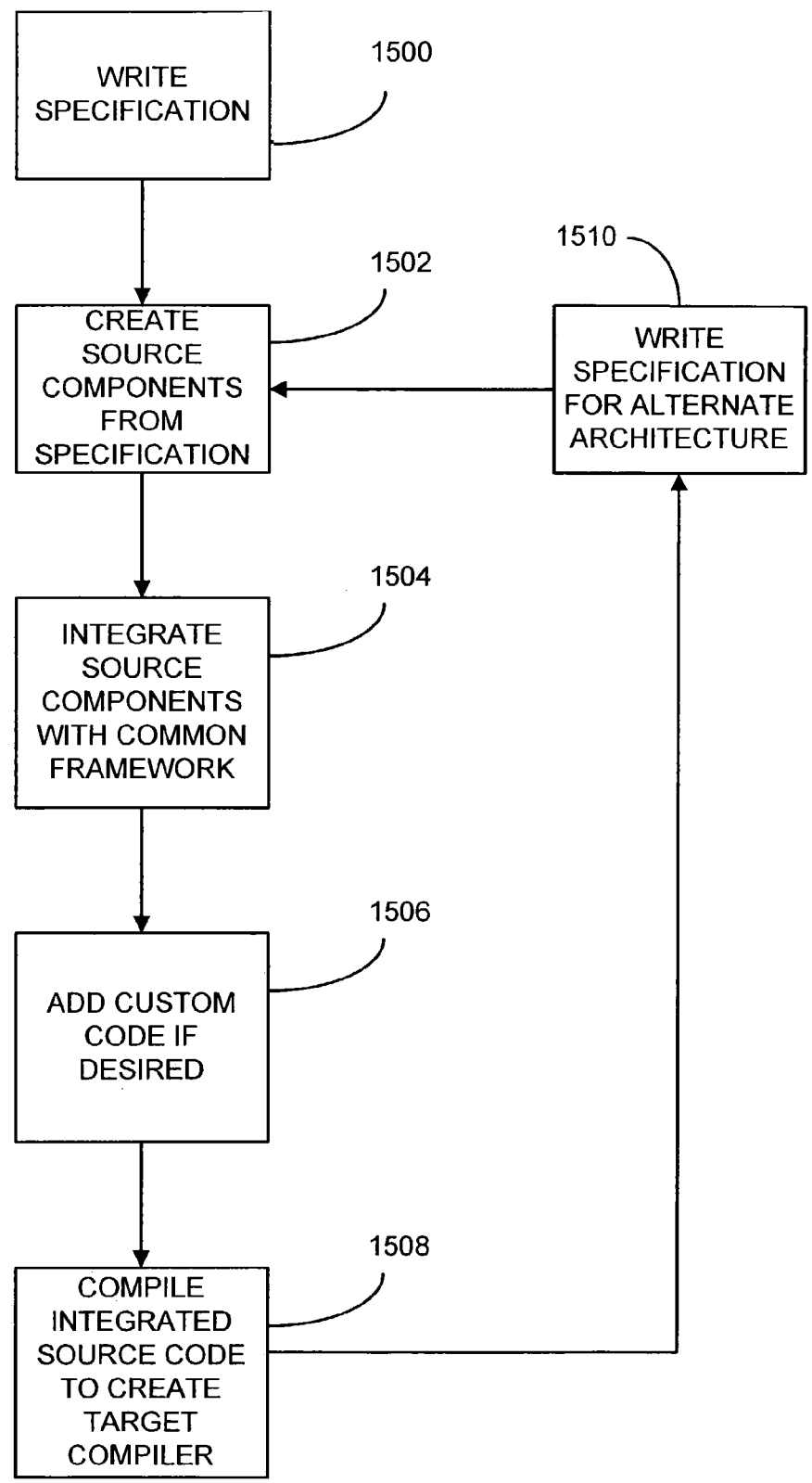
FIG. 15 is a flowchart of one embodiment of a method for retargeting components.

FIG. 15 is a flowchart of one embodiment of a method for retargeting code generation components suitable for use with the system, tool, and language described herein. A first target software development tool is created by writing a specification at block 1500 for a particular architecture. The specification is then processed to create a number of components represented by source code at block 1502. The source components are then integrated into a framework represented by source code at block 1504.

If desired, custom code can be included as well at block 1506. The integrated source code is then compiled at block 1508 to create a target software development tool from the code generation components. In order to retarget the development tool to a different architecture, an alternate specification is written at block 1510 and processed similar to the first specification starting at block 1502 to create a new software development tool targeted to the alternate architecture.

Figure 16:
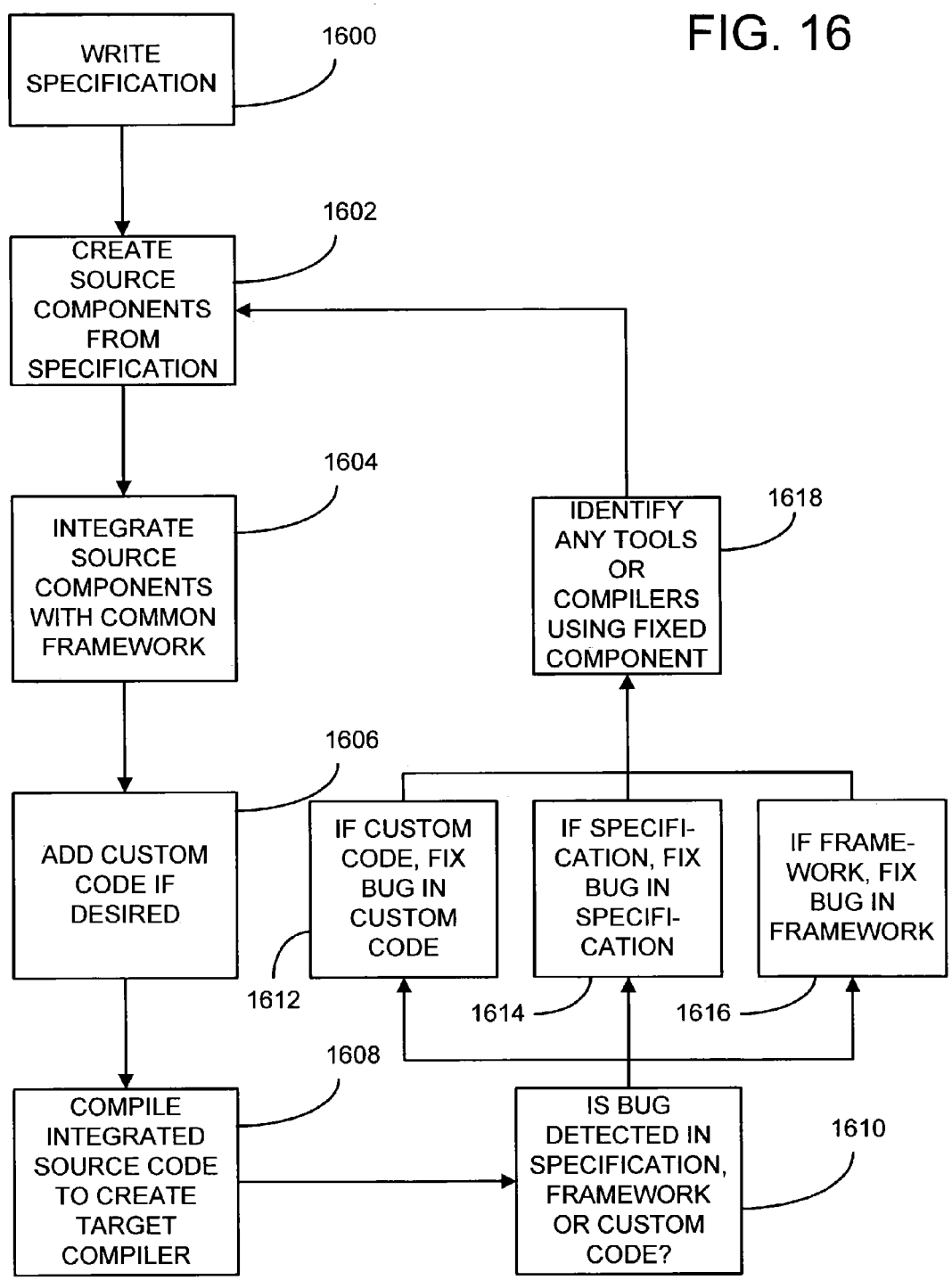
FIG. 16 is a flowchart of one embodiment of a method for auto-generating updated components.

FIG. 16 is a flowchart of one embodiment of a method for auto-generating updated code generation components suitable for use with the system, tool, and language described herein. In order to create a target software development tool, a specification is written at block 1600 for a particular architecture. The specification is then processed to create a number of components represented by source code at block 1602. The source components are then integrated into a framework represented by source code at block 1604. If desired, custom code can be included as well at block 1606. The integrated source code is then compiled at block 1608 to create a target software development tool from the code generation components.

Assume for purposes of this embodiment that a bug is found in the target software development tool. At 1610, it is determined whether the bug is caused by code dependent on the specification, framework, or custom code. If the bug is caused by code dependent on the custom code, the custom code is fixed at process block 1612 in order to alleviate the bug.

If the bug is caused by code dependent on the specification, the specification is fixed at process block 1614 in order to alleviate the bug. If the bug is caused by code dependent on the common framework, the common framework is fixed at process block 1616 in order to alleviate the bug.

Once the source code responsible for the bug is fixed, any tools containing faulty source code are identified at block 1618. The tools identified, including the original target software development tool, is then re-generated by processing blocks 1602 through 1608 using the fixed code section.

Exemplary Compilation Process

Figure 17:
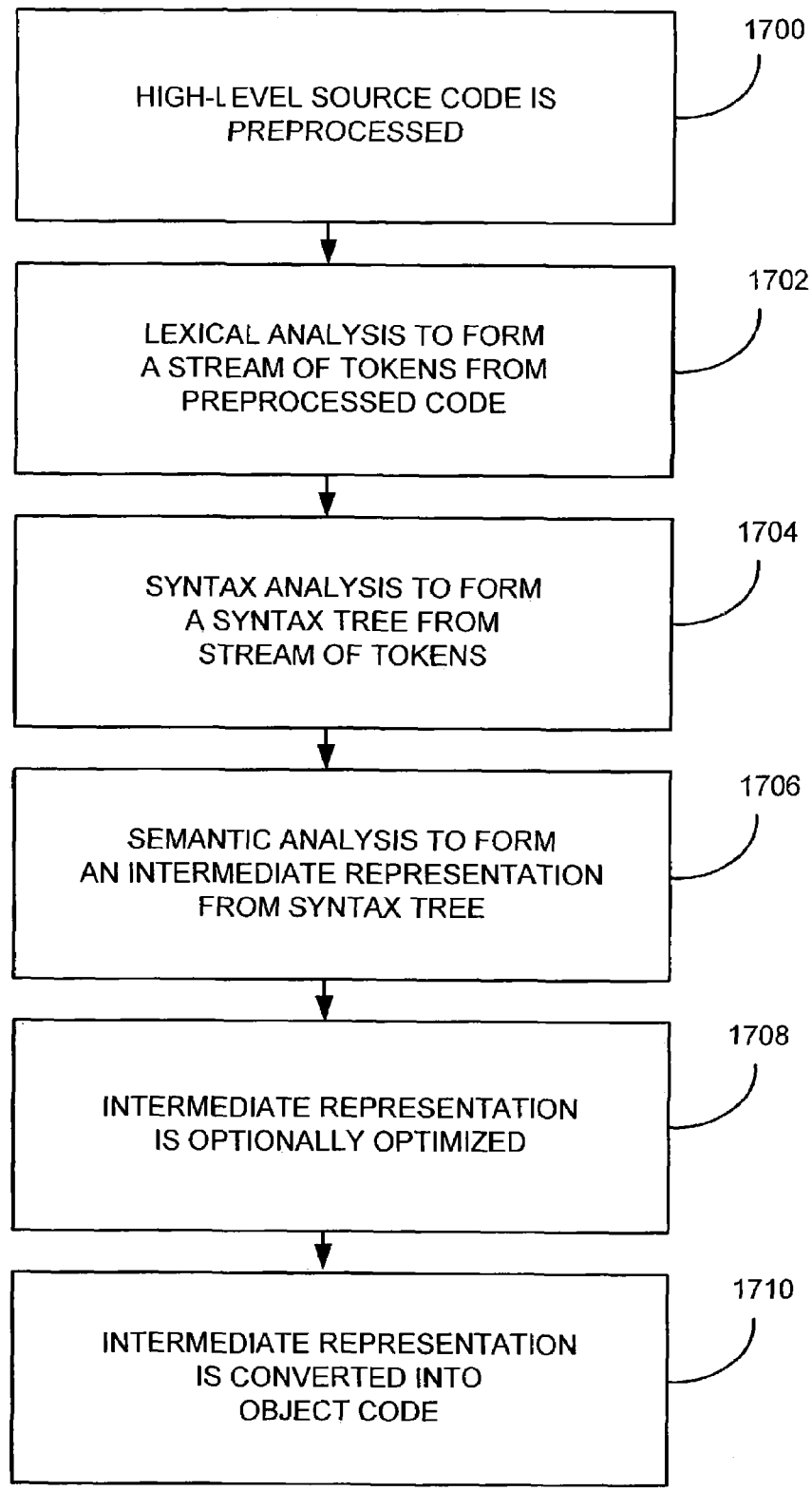
FIG. 17 is a flow chart of an exemplary compilation process implemented by a compiler constructed via the technologies described herein.

FIG. 17 shows an exemplary compilation process implemented by software (e.g., a compiler) generated via the described technologies. The compilation process begins with source code written by the programmer in a high-level programming language (e.g. C/C++, Pascal, Fortran, etc.). The source code is provided to a preprocessor at 1700 where usually a symbol within the high-level programming language directs the preprocessor to include files, perform conditional compilation, or perform macro expansion. The resulting code then undergoes lexical analysis at 1702 to parse code into a stream of tokens. Syntax analysis is then performed at 1704 by the compiler so as to assemble: a syntax tree based on the overall structure and flow of the program. Next, the syntax tree is semantically analyzed at 1706 to produce an intermediate representation ("IR"). The IR is a lowered language wherein much of the context of the source code has been lost but allows the software to be more easily optimized. If optimization is desired, the intermediate representation will be optimized at 1708, and finally compiled into executable object code at 1710.

Thus, the compilation process involves transforming instructions from one level or representation to another. For instance, FIG. 18 shows the conversion of a source code statement into an IR, as well as the conversion of the IR to native code (machine-dependent). Source code statement 1800 can be written in a number of high-level programming languages. These languages are designed to allow programmers to write and read code in a manner that is easily understood. Thus, the programmer is allowed to use characters like '+' for addition, and allowed use of more powerful forms, such as adding more than two operands as shown in statement 1800.

Statements 1802-1806 are an IR representation of statement 1800 that represents the same functionality, but does so in a format closer to that as would be understood by a computer and yet is still architecture independent. Statement 1802 uses an 'ADD' command to add a first and second variable and assigns the result to a first temporary variable t1. Statement 1804 then uses another 'ADD' command to add t1 to the third variable and assigns the result to a second temporary variable t2. Statement 1806 then assigns the value of t2 to the result variable z using an 'ASSIGN' instruction.

Statements 1808-1812 are a native code representation of the IR in statements 1802-1806. Statement 1808 uses an add instruction specific to the Intel® x86 architecture to add the values of two variables stored at specified registers and stores the result in a register assigned to a temporary variable t1. Statement 1810 uses the add instruction specific to the Intel® x86 architecture to add the values of t1 and a third variable stored at the specified registers and stores the result in the specified register (EAX) assigned to t2. Statement 1812 then uses a move instruction specific to the Intel® x86 architecture to move the value stored in EAX to the output variable z.

While a standard native. code compiler converts source to an IR, and then IR to native code, there are many other types of conversions that occur in various tools. For instance, Just-in-Time and Pre Just-in-Time compilers convert an IR to native code. Some optimizers can convert native code into an IR for optimization, and then convert the IR back to native code.

Figure 19:
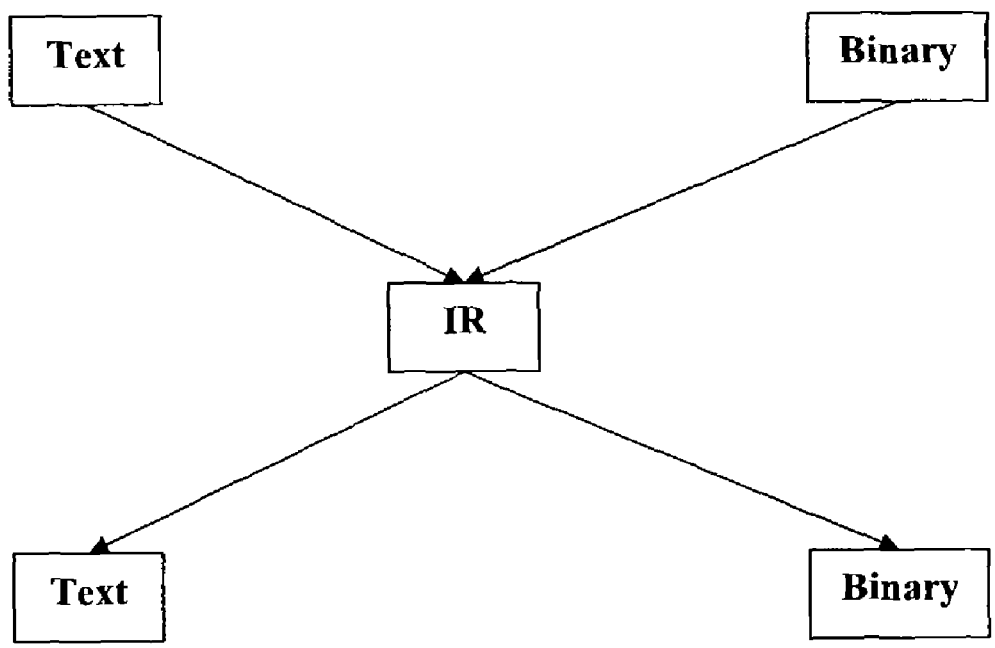
FIG. 19 shows the relationship between IR, assembly text and binary translations.

Therefore, an IR is the common denominator in the components that make up compilers and programming tools. Such components translate from IR to both assembly (text) and binary, and also from assembly and binary to IR. FIG. 19 shows this relationship. The IR referred to herein can be common and compatible across numerous platforms.

Exemplary Intermediate Representation ("IR")

The technologies described herein can use an IR that is common across platforms. Assembly and binary formats can be transformed into the IR and then IR into assembly and binary. Therefore, a target architecture specification language is provided which can be used to efficiently to describe the IR, assembly and binary grammars. The automated software development tool generator accepts a specification and generates grammars to integrate into the common framework.

In one embodiment, translating IR into assembly and binary can be accomplished programmatically and parsing assembly and decoding binary into IR is a grammatical process. The retargeting tool generates functions that correspond to the grammatical elements of the retargeting specification. The description file format is geared toward associating the assembly and binary representations with the corresponding IR. A parameterized grammar can be at the center of this association.

With respect to the IR, exemplary components can include assembly components (e.g., for assembling instructions from assembly text into an intermediate representation), disassembly components (e.g., for listing an intermediate instruction as assembly text), encoding components (e.g., for encoding an intermediate representation instruction as binary), decoding components (e.g., for decoding instructions from binary to an intermediate representation), opcode selection components (e.g., for selecting an intermediate representation opcode), instruction legalization components (e.g., for enforcing instruction limitations), and various machine-specific tables (e.g., opcode, legalization, and register tables).

The automated software development tool generator can use a common IR for definition and construction of the various components. The target architecture specification can be processed such that assembly and binary formats can be translated into the IR and IR into assembly and binary.

Exemplary Operating Environment

Figure 20:
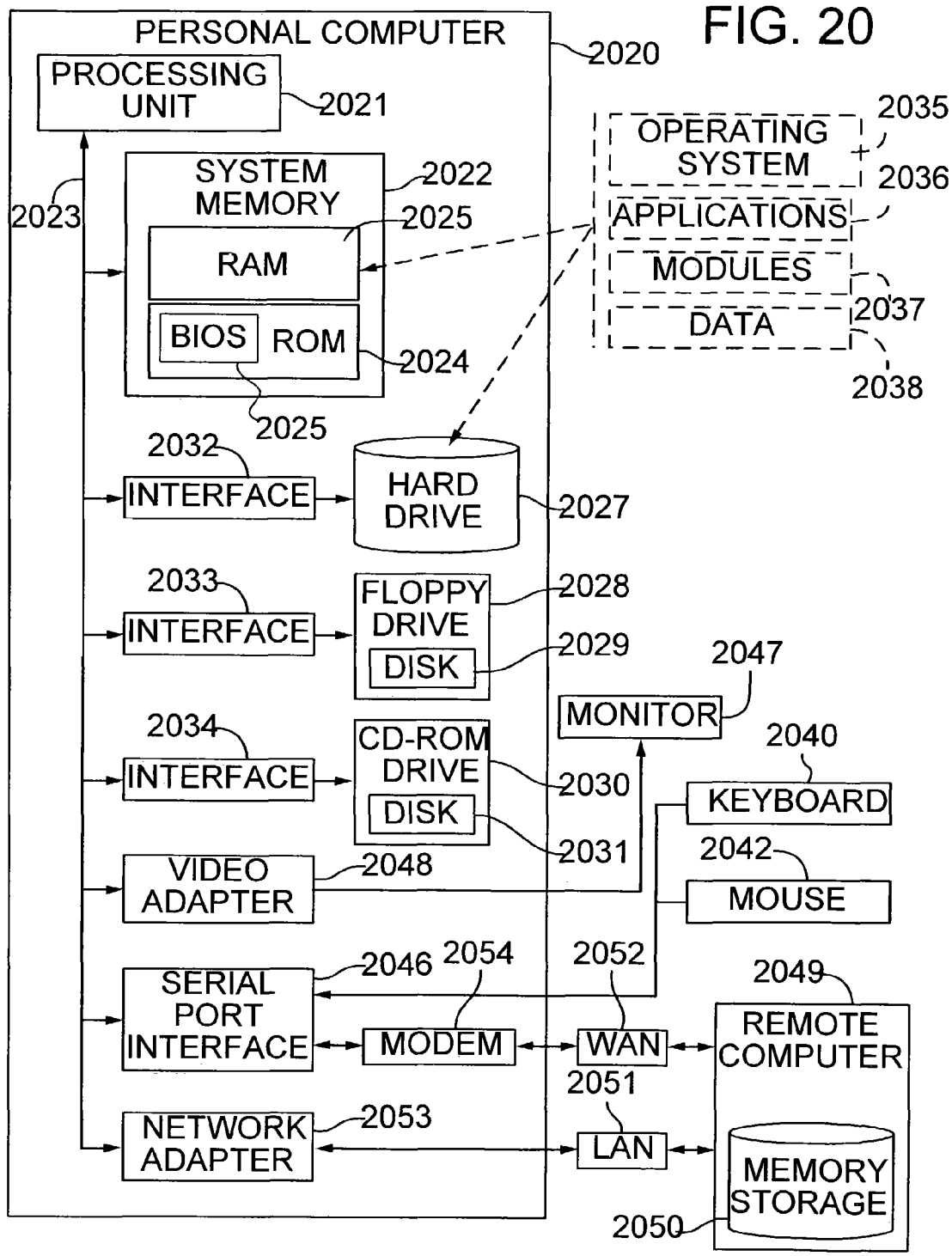
FIG. 20 is a block diagram of a computer system that serves as an operating environment for automatically generating software. development tools and components.

FIG. 20 illustrates an example of a computer system that serves as an operating environment for implementing the described system, tool, language, and methods. The computer system includes a computer 2020, including a processing unit 2021, a system memory 2022, and a system bus 2023 that interconnects various system components including the system memory to the processing unit 2021. The system bus may comprise any of several types of bus structures including a memory bus or memory controller, a peripheral bus, and a local bus using a bus architecture such as PCI, VESA, Microchannel (MCA), ISA and EISA, to name a few. The system memory includes read only memory (ROM) 2024 and random access memory (RAM) 2025. A basic input/output system 2026 (BIOS), containing the basic routines that help to transfer information between elements within the personal computer 2020, such as during start-up, is stored in ROM 2024. The personal computer 2020 further includes a hard disk drive 2027, a magnetic disk drive 2028, e.g., to read from or write to a removable disk 2029, and an optical disk drive 2030, e.g., for reading a CD-ROM disk 2031 or to read from or write to other optical media. The hard disk drive 2027, magnetic disk drive 2028, and optical disk drive 2030 are connected to the system bus 2023 by a hard disk drive interface 2032, a magnetic disk drive interface 2033, and an optical drive interface 2034, respectively. The drives and their associated computer-readable media provide nonvolatile storage of data, data structures, computer-executable instructions (program code such as dynamic link libraries, and executable files), etc. for the personal computer 2020. Although the description of computer-readable media above refers to a hard disk, a removable magnetic disk and a CD, it can also include other types of media that are readable by, a computer, such as magnetic cassettes, flash memory cards, digital video disks, Bernoulli cartridges, and the like.

A number of program modules may be stored in the drives and RAM 2025, including an operating system 2035, one or more application programs 2036, other program modules 2037, and program data 2038. A user may enter commands and information into the personal computer 2020 through a keyboard 2040 and pointing device, such as a mouse 2042. Other input devices (not shown) may include a microphone, joystick, game pad, satellite dish, scanner, or the like. These and other input devices are often connected to the processing unit 2021 through a serial port interface 2049 that is coupled to the system bus, but may be connected by other interfaces, such as a parallel port, game port or a universal serial bus (USB). A monitor 2047 or other type of display device is also connected to the system bus 2023 via an interface, such as a display controller or video adapter 2048. In, addition to the monitor, personal computers typically include other peripheral output devices (not shown), such as speakers and printers.

The personal computer 2020 may operate in a networked environment using logical connections to one or more remote computers, such as a remote computer 2049. The remote computer 2049 may be a server, a router, a peer device or other common network node, and typically includes many or all of the elements described relative to the personal computer 2020, although only a memory storage device 2050 has been illustrated in FIG. 20. The logical connections depicted in FIG. 20 include a local area network (LAN) 2051 and a wide area network (WAN) 2052. Such networking environments are commonplace in offices, enterprise-wide computer networks, intranets and the Internet.

When used in a LAN networking environment, the personal computer 2020 is connected to the local network 2051 through a network interface or adapter 2053. When used in a WAN networking environment, the personal computer 2020 typically includes a modem 2054 or other means for establishing communications over the wide area network 2052, such as the Internet. The modem 2054, which may be internal or external, is connected to the system bus 2023 via the serial port interface 2046. In a networked environment, program modules depicted relative to the personal computer 2020, or portions thereof, may be stored in the remote memory storage device. The network connections shown are merely examples and other means of establishing a communications link between the computers may be used.

Exemplary Alternatives

Having illustrated and described the principles of the illustrated embodiments, the embodiments can be modified in arrangement and detail without departing from such principles.

In view of the many possible embodiments, it will be recognized that the illustrated embodiments include only examples and should not be taken as a limitation on the scope of the invention. Rather, the invention is defined by the following claims. I therefore claim as the invention all such embodiments that come within the scope of these claims.

I claim:

1. A system for auto-generating code generation software development tool components, the system comprising:
one or more frameworks describing one or more processor architecture-independent features for a plurality of software development tool components, wherein the plurality of software development tool components comprise one or more selected from the group consisting of:

assembly components, disassembly components, encoding components, decoding components, opcode selection components, and instruction legalization components;

a component generation tool for processing a specification describing a target processor architecture and the frameworks; wherein the component generation tool is operable to generate software development tool component data from which the plurality of software development tool components can be generated, wherein the software development tool component data comprises an instruction legalization table, wherein at least one software development tool component of the plurality of software development tool components is included in a plurality of different software development tools, wherein the software development tool component data comprises target processor architecture-specific data for an assembler, a disassembler, an encoder, a decoder, and an instruction legalizer, and wherein the component generation tool is operable to process a second specification describing a different second target processor architecture to generate software development component data appropriate for the second target processor architecture; and a processing unit for executing the component generation tool.

2. The system of claim 1 further comprising:
a compiler for generating a software development tool from the software development tool component data.

3. The system of claim 1 further comprising custom code for implementing features for the target processor architecture.

4. The system of claim 1 wherein the software development tool component data relates to a compiler component.

5. The system of claim 1 wherein the target processor architecture is a virtual machine.

6. The system of claim 1 wherein the specification describes the target processor architecture by equating assembly and binary forms to each of a plurality of intermediate representation forms.

7. The system of 1 wherein the specification describes the target processor architecture by listing register and instruction data for the target processor architecture.

8. A computer-readable medium comprising:
computer-executable instructions in a specification language for representing a target processor architecture; and
one or more frameworks describing processor architecture-independent features for software development tool components for the target processor architecture, wherein the software development tool components comprise one or more selected from the group consisting of: assembly components, disassembly components, encoding components, decoding components, opcode selection components, and instruction legalization components;
wherein the instructions, in combination with the frameworks, are executable for generating the software development tool components for the target processor architecture, wherein the software development tool components are used for generating a plurality of different software development tools, and wherein at least one software development tool component of the software development tool components is included in two or more of the plurality of different software development tools.

9. The computer-readable medium of claim 8 wherein the instructions comprise a plurality of intermediate representation instructions associated with both an assembly language form and a binary form.

10. The computer-readable medium of claim 9 wherein the intermediate representation instructions are presented in a legal form.

11. The computer-readable medium of claim 8 further comprising data describing register and memory information for the target processor architecture.

12. The computer-readable medium of claim 8 further comprising expansions for implementing intrinsic functions and general instruction sequences.

13. The computer-readable medium of claim 8 further comprising configuration data relating to the target processor architecture.

14. A computer-readable medium comprising:
computer-executable instructions for causing a computer to execute a tool for auto-generating software development tool components, the tool comprising:
a means for receiving a specification describing a target processor architecture;
a means for creating source code describing one or more software development tool components from the specification, wherein the software development tool components comprise one or more selected from the group consisting of: assembly components, disassembly components, encoding components, decoding components, opcode selection components, and instruction legalization components;
a means for integrating the source code into one or more frameworks; and
a means for creating one or more software development tool components from the integrated framework, wherein the one or more software development tool components are used for generating a plurality of different software development tools, and wherein at least one software development tool component of the one or more software development tool components is included in two or more of the plurality of different software development tools.

15. The computer-readable medium of claim 14, wherein the tool is operable to receive a second specification for describing software development tool components in a processor architecture-independent manner.

16. The computer-readable medium of claim 14 further comprising a means for integrating custom code into the framework.

17. The computer-readable medium of claim 14 wherein the one or more software development tool components comprise compiler components targeted to the target processor architecture described in the specification.

18. The computer-readable medium of claim 14 wherein the specification comprises data associating legal intermediate representation instruction forms with a legal binary form and legal text form.

19. The computer-readable medium of claim 14 wherein the source code describing one or more software development tool components contains information specific to the target processor architecture necessary for creating the one or more software development tool components.

20. The computer-readable medium of claim 14 wherein the framework comprises source code representing the one or more software development tool components in a manner generic to any one specific programming environment.

21. A method for auto-generating software development tool components of a plurality of different software development tools for a target processor architecture, the method comprising:
providing a specification describing the target processor architecture;

creating one or more descriptions of software development tool components from the specification, wherein the software development tool components comprise one or more selected from the group consisting of: assembly components, disassembly components, encoding components, decoding components, opcode selection components, and instruction legalization components;

creating a target compiler description comprising the one or more descriptions and one or more frameworks;

creating the software development tool components from the one or more descriptions and one or more frameworks;

creating a target compiler from the target compiler description and the software development tool components;

creating a target debugger description comprising the one or more descriptions and one or more frameworks; and creating a target debugger from the target debugger description and the software development tool components;

wherein the plurality of different software development tools comprises the target compiler and the target debugger, and wherein the software development tool components are used in both the target compiler and the target debugger.

22. The method of claim 21 further comprising providing a second specification unrelated to the target processor architecture.

23. The method of claim 21 wherein the target compiler description further comprises custom source code.

24. The method of claim 21 wherein the specification relates legal forms of an intermediate representation to appropriate binary and assembly forms.

25. The method of claim 21 wherein the one or more descriptions contain data relating to one or more software development tool components specific to the target processor architecture.

26. The method of claim 21 wherein the frameworks contain data relating to one or more software development tool components non-specific to the target processor architecture.

27. A method of retargeting a plurality of different software development tools from a first processor architecture to a different second processor architecture comprising:

creating a first specification describing the first processor architecture;

creating one or more frameworks describing software development tool components in a processor architecture-independent manner;

creating a first plurality of different software development tools targeted to the first processor architecture from a combination of the first specification and the one or more frameworks;

creating a second specification describing the second processor architecture; and creating a second plurality of different software development tools targeted to the second processor architecture from a combination of the second specification and the one or more frameworks;

wherein the first and second specifications contain data for creating a plurality of software development tool components targeted to the specific first and second processor architectures, wherein the plurality of software development tool components comprise one or more selected from the group consisting of: assembly components, disassembly components, encoding components, decoding components, opcode selection components, and instruction legalization components, wherein the plurality of software development tool components are used when creating the first and second plurality of different software development tools, and wherein at least one software development tool component of the plurality of software development tool components is included in two or more of the first and second plurality of different software development tools.

28. The method of claim 27 wherein the data comprises intermediate representation, binary and assembly language forms of machine instructions.

29. A method for updating a targeted plurality of different software development tools, the method comprising the following:

a) providing a specification describing a target processor architecture;

b) parsing the specification to create data relating to a plurality of software development tool components, wherein the plurality of software development tool components comprise one or more selected from the group consisting of: assembly components, disassembly components, encoding components, decoding components, opcode selection components, and instruction legalization components;

c) combining the data relating to a plurality of software development tool components with data relating to a common framework;

d) compiling the combined data to create the targeted plurality of different software development tools comprising software development tool components, wherein at least one software development tool component of the software development tool components is included in two or more of the targeted plurality of different software development tools;

e) updating at least one of the data relating to the common framework and the specification; and f) reprocessing steps a)-d) using either the updated common framework or specification.

30. An automated method of generating software development tools, the method comprising:

reading by software of a target processor architecture specification for a target processor architecture, wherein the target processor architecture specification comprises definitions of architecture-specific features sufficient to inform construction of any of a plurality of software development tool components so that they function properly for the target processor architecture;

generating by software a plurality of software development tool components based at least on part on the target processor architecture specification, wherein the plurality of software development tool components comprise one or more selected from the group consisting of: assembly components, disassembly components, encoding components, decoding components, opcode selection components, and instruction legalization components; and integrating by software the software development tool components to generate a plurality of different software development tools for the target processor architecture, wherein at least one software development tool component of the software development tool components is included in two or more of the plurality of different software development tools.

31. One or more computer readable media comprising computer-executable instructions for performing the method of claim 30.

32. The method of claim 30 wherein the plurality of different software development tools comprises a compiler and a debugger.

* * * * *